US006600718B2

(12) United States Patent
Shimada et al.

(10) Patent No.: US 6,600,718 B2
(45) Date of Patent: *Jul. 29, 2003

(54) SEALABLE COVER FOR A PACKAGE AND PACKAGE SYSTEM FOR DISK-FORM RECORDING MEDIUM

(75) Inventors: Mitsuhiro Shimada, Chiba (JP); Atsuhiro Kumagai, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/396,262

(22) Filed: Sep. 15, 1999

(65) Prior Publication Data

US 2002/0064125 A1 May 30, 2002

(30) Foreign Application Priority Data

Sep. 17, 1998 (JP) ............................................ 10-263381
Aug. 19, 1999 (JP) ............................................ 11-232280

(51) Int. Cl.[7] ............................................... G11B 23/03
(52) U.S. Cl. ...................................................... 369/290
(58) Field of Search ............................. 369/275.5, 289, 369/290, 291

(56) References Cited

U.S. PATENT DOCUMENTS

| 2,886,330 | A | * | 5/1959 | Hafermeyer ................. 360/131 |
| 4,168,835 | A | * | 9/1979 | Omiya et al. ................. 360/133 |
| 5,020,048 | A | * | 5/1991 | Arai et al. .................... 369/291 |
| 5,319,630 | A | * | 6/1994 | Earman et al. ............... 369/291 |
| 5,381,402 | A | * | 1/1995 | Lee et al. ..................... 369/291 |
| 5,757,764 | A | * | 5/1998 | Tanaka ......................... 369/291 |
| 5,825,747 | A | * | 10/1998 | Tanaka ........................ 369/291 |
| 5,922,430 | A | * | 7/1999 | Biddlecome ................ 428/66.6 |
| 5,923,630 | A | * | 7/1999 | Yoshida et al. ............. 369/77.2 |
| 5,926,454 | A | * | 7/1999 | Mizutani ..................... 369/291 |
| 5,970,045 | A | * | 10/1999 | Aoki et al. .................. 369/192 |
| 6,078,563 | A | * | 6/2000 | Goto et al. ................... 369/291 |
| 6,118,757 | A | * | 9/2000 | Olsen et al. ................. 369/291 |
| 6,147,962 | A | * | 11/2000 | Scrinivasan et al. ........ 369/291 |
| 6,172,962 | B1 | * | 1/2001 | Goto et al. ................... 369/291 |
| 6,198,718 | B1 | * | 3/2001 | Watanabe et al. ........... 369/291 |
| 6,212,037 | B1 | * | 4/2001 | Fukuda ........................ 360/133 |

* cited by examiner

*Primary Examiner*—George J. Lestcher
(74) *Attorney, Agent, or Firm*—Frommer Lawrence & Haug LLP; William S. Frommer; Matthew K. Ryan

(57) ABSTRACT

The package mounted to a recording and/or reproducing apparatus with a disk-form recording medium such as a magneto-optic disk, etc. housed is formed with thin a sheet plate member such as a plastic thin sheet, etc., thereby enabling simplification of the construction and reduction of cost. In a housing container (3) equipped with a housing section (2) for housing a disk-form recording medium, a cover (4) formed with a thin plate member for closing the opening of the housing section (2) is joined to form a package (1). To the cover (4), a detaching section (7) is formed at a section opposite at least a part of the recording section of a disk-form recording medium housed in the housing section (2), and the detaching section (7) is detached to form an opening at the cover (4) when the disk-form recording medium is used.

8 Claims, 15 Drawing Sheets

F I G. 14
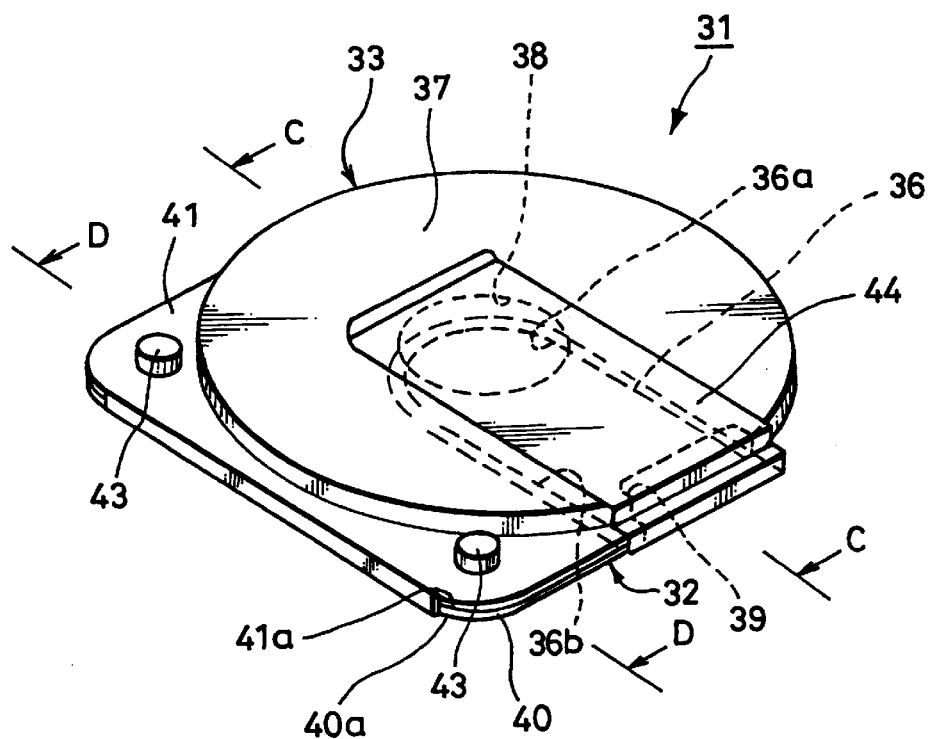
F I G. 15
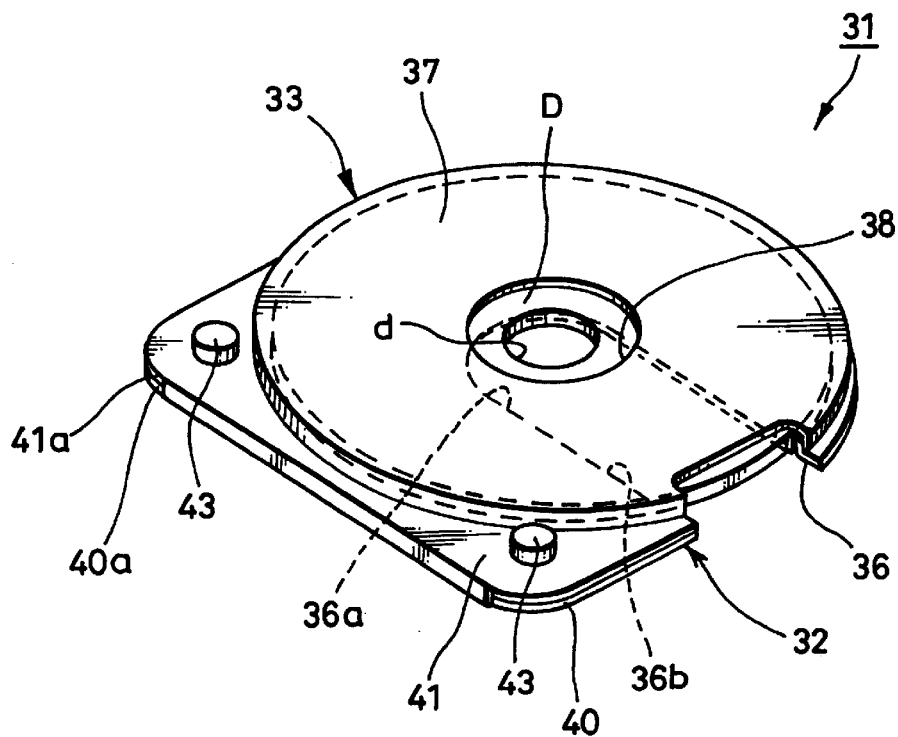

SEALABLE COVER FOR A PACKAGE AND PACKAGE SYSTEM FOR DISK-FORM RECORDING MEDIUM

BACKGROUND OF THE INVENTION

1. Field of the Invention

The present invention relates to a package and a package system for a disk-form recording medium mounted to and taken out from a recording and/or reproducing apparatus with a disk-form recording medium such as optical disk, a magneto-optic disk, etc. housed.

2. Description of the Related Art

Hitherto, for a package of a disk-form recording medium which is mounted to and taken out from a recording and/or reproducing apparatus with an optical disk, a magneto-optic disk, or magnetic disk stored, a disk cartridge has been popularly used. For this kind of disk cartridges, those discussed in U.S. Pat. No. 4,510,546 have been known.

The disk cartridge discussed in this specification houses a disk as an information recording medium rotatably in a rectangular main body. To the cartridge proper, an opening for recording and/or reproducing that allows a part of the housed disk to face the outside throughout the inner and the outer circumferences is formed. To this cartridge proper, a shutter member with a U-shaped cross section which moves along the front surface of the cartridge proper to open and close the opening for recording and/or reproducing.

In addition, for another packages of a disk-form recording medium, a disk cartridge constructed to freely take out a disk inside the cartridge or ta hat called a disk caddie are used. For this kind of disk cartridges, those discussed in U.S. Pat. No. 4,746,013 are known.

The disk cartridge discussed in this specification also rotatably houses a disk which serves as an information recording medium in a rectangular main body. To the cartridge main body, an opening for recording and/or reproducing which allows a part of the housed disk to face the outside throughout the inner and the outer circumferences and an opening for disk drive which allows the center portion of the disk to face the outside are provided as one continuing opening. To this cartridge proper, a shutter member with a cross section forming nearly an L-letter shape is installed to move along the front surface of the cartridge proper to open and close the opening for recording and/or reproducing as well as disk drive. In this disk cartridge, the cover on the top surface of the disk housing section is free to open and close so that the inside is constructed to enable disk replacement. In addition, to the inner surface of the center portion of the cover at this top surface, a member for chucking a disk is disposed.

However, the disk cartridge discussed in the above-mentioned U.S. Pat. No. 4,510,546 has many components such as top and bottom shells, shutter, shutter springs, etc., requires a complicated assembly process, and needs so much cost. In addition, with this disk cartridge, the top and bottom shells that house the disk are unable to be separated, and the disk inside the cartridge is, in general, unable to be taken out.

The cartridge or disk caddie discussed in U.S. Pat. No. 4,746,013 also have a large number of components and costs high, but has a construction that enables the replacement of disks.

Now, in a recordable disk-form recording medium, contaminating the disk surface with dust or fingerprints before recording, the contaminated portion may be unable to achieve good recording. The requirements for contamination increase severity because recently it becomes possible to record more as information in one disk, that is, the recording density has increased. Therefore, before recording, the recording medium is placed in a disk cartridge or disk caddie recited in the U.S. Pat. No. 4,746,013 for recording. After completion of recording, the disk is frequently used independently with the disk cartridge or disk caddie removed. In such event, the disk before recording must be placed in a disk cartridge or disk caddie one by one, causing a problem that the disk may accidentally be contaminated with fingerprints or dust.

SUMMARY OF THE INVENTION

Under these circumstances, it is a primary object of the present invention to provide a package and package system for disk-form recording medium, which is easy to assemble and costs low by reducing the number of components and simplifying the construction.

It is another object of the present invention to eliminate troublesome operation of placing a disk into a disk caddie each time and to enable the comfortable operation by placing the disk-form recording medium before recording in a simple package from the beginning.

It is a further object of the present invention to easily take out and use the disk-form recording medium only, though the disk-form recording medium may be used as it is after recording.

In order to achieve the objects, the present invention relates to a package for a disk-form recording medium, and comprises a housing container equipped with a housing section for housing the disk-form recording medium, a cover for closing and opening of the housing section, and a detaching section removably constructed with the opposite portion of the cover which is opposite to at least a part of the recording section of the disk-form recording medium housed in the housing section, wherein the edge portion of the detaching section of the cover is configured to be detached by cutting.

In the above-mentioned configuration, a gripping means is installed to a part of the detaching section of the cover.

In the above-mentioned configuration, a member for restricting the movement of the disk-form recording medium in the housing container is installed to a part of the detaching section of the cover.

In addition, in the above-mentioned configuration, a disk-form recording medium is configured to be freely taken out from the housing container.

The package for the disk-form recording medium according to the present invention configured in this way houses the disk-form recording medium in a housing section of the housing container, and houses and seals the same by closing an opening of the housing section by the cover. To record and/or reproduce the housed and sealed disk-form recording medium, the detaching section of the cover is cut at the edge portion to detach and at least a part of the recording section of the disk-form recording medium is exposed.

The detaching section of this cover is able to be easily cut and detached at the edge portion by pulling the gripping means installed to a part of the detaching section.

The disk-form recording medium housed and sealed in the package is able to have the movement restricted by the member for restricting the movement installed to a part of the detaching section of the cover and an unnecessary play prevented.

Furthermore, the disk-form recording medium housed and sealed in the package is able to be easily taken out from the housing container by peeling the cover to open the opening.

The present invention relates to a package system for a disk-form recording medium, and comprises a housing container equipped with a housing section for housing a disk-form recording medium, a cover that has an opening opposite to at least a part of the recording section at least the disk-form recording medium in the housing section of the package proper and covers the housing section, and a sealing member for removably sealing the opening of the cover.

In the above configuration, a gripping means is installed to a part of the sealing member.

In the above configuration, a member for restricting the movement of the disk-form recording medium in the housing container is installed to a part of the sealing member.

Furthermore, a disk-form recording medium is removably taken out from the housing container.

The package system for a disk-form recording medium configured in this way according to the present invention houses and seals by housing a disk-form recording medium in the housing section of the housing container, covering the housing section with a cover equipped with an opening, and sealing the opening of the cover with a sealing member. To record and/or reproduce the disk-form recording medium housed and sealed, the sealing member is detached from the opening of the cover to open the opening, and at least a part of the recording section of the disk-form recording medium is exposed.

The sealing member for sealing the opening of this cover is able to be easily detached by pulling the gripping means installed to a part of the sealing member.

The disk-form recording medium housed and sealed in the package has the movement restricted by the member for restricting the movement installed to a part of the sealing member of the cover and an unrequited play prevented.

Furthermore, the disk-form recording medium housed and sealed in the package is able to be easily taken out from the housing container by peeling the cover from the housing container to open the opening.

In addition, the present invention relates to a package for a disk-form recording medium, comprises a housing container having a housing section for housing a disk-form recording medium and a cover for closing the opening of the housing section, and a removably configured detaching section of the cover at the opposite portion of the cover which is opposite to at least a part of the recording section of the disk-form medium housed in the housing section, and the edge portion of the detaching section of the cover is configured to be detached by cutting.

In the above-mentioned configuration, a gripping means is installed to a part of the detaching section of the cover.

In the above-mentioned configuration, a member for restricting the movement of the disk-form recording medium in the housing container is installed to a part of the detaching section of the cover.

Furthermore, the disk-form recording medium is able to be freely taken out from the housing container.

The package for a disk-form recording medium according to the present invention configured in this way houses and seals a disk-form recording medium by housing the disk-form recording medium in the housing section of the housing container and closing the opening of the housing section by the cover. To record and/or reproduce the housed and sealed disk-form recording medium, at least a part of the recording section of the disk-form recording medium is exposed by cutting and detaching the detaching section configured opposite to at least a part of the disk-form recording medium at the edge portion.

The detaching section of this cover is able to be easily detached by pulling the gripping means installed to a part of the detaching member.

The disk-form recording medium housed and sealed in the package has the movement restricted by the member for restricting the movement installed to a part of the detaching section of the cover and an unrequited play prevented.

Furthermore, the disk-form recording medium housed and sealed in the package is able to be easily taken out from the housing container by peeling the cover from the housing container to open the opening.

In addition, the present invention relates to a package system for a disk-form recording medium, and comprises a housing container that has an opening opposite to a housing section for housing the disk-form recording medium and opposite at least to a part of the recording section of at least the disk recording medium of the housing section of the package proper and a cover covering the housing section, and a sealing member for removably sealing the opening of the cover.

In the above-mentioned configuration, a gripping means is installed to a part of the sealing member.

In the above-mentioned configuration, a member for restricting the movement of the disk-form recording medium in the housing container is installed to a part of the sealing member.

Furthermore, the disk-form recording medium is able to be freely taken out from the housing container in the above-mentioned configuration.

The package for the disk-form recording medium configured in this way according to the present invention overs the housing section housing the disk-form recording medium into the housing section of the housing container with a cover equipped with a chucking opening opposite at least to a part of the recording section, and housed and sealed to the recording section by sealing the chucking opening of the cover with a sealing member which removably and adhesively seals the hucking opening. To record and/or reproduce the housed and sealed disk-form recording medium, at least a part of the recording section of the disk-form recording medium is exposed by detaching the sealing member from the chucking opening of the cover to open the opening and exposing at least a part of the recording portion of the disk-form recording medium.

The sealing member for sealing the opening of this cover is able to be easily detached by pulling the gripping means installed to a part of the sealing member.

The disk-form recording medium housed and sealed in the package has the movement restricted by the member for restricting the movement installed to a part of the sealing member of the cover and an unrequired play prevented.

Furthermore, the disk-form recording medium housed and sealed in the package is able to be easily taken out from the housing container by peeling the cover from the housing container to open the opening.

BRIEF DESCRIPTION OF THE DRAWINGS

FIG. 14 is a perspective view showing the condition in which the case section of the disk case shown in FIG. 13 is closed;

FIG. 15 is a perspective view showing the application condition of the disk case shown in FIG. 13;

DETAILED DESCRIPTION OF THE PREFERRED EMBODIMENT

Figure 1:
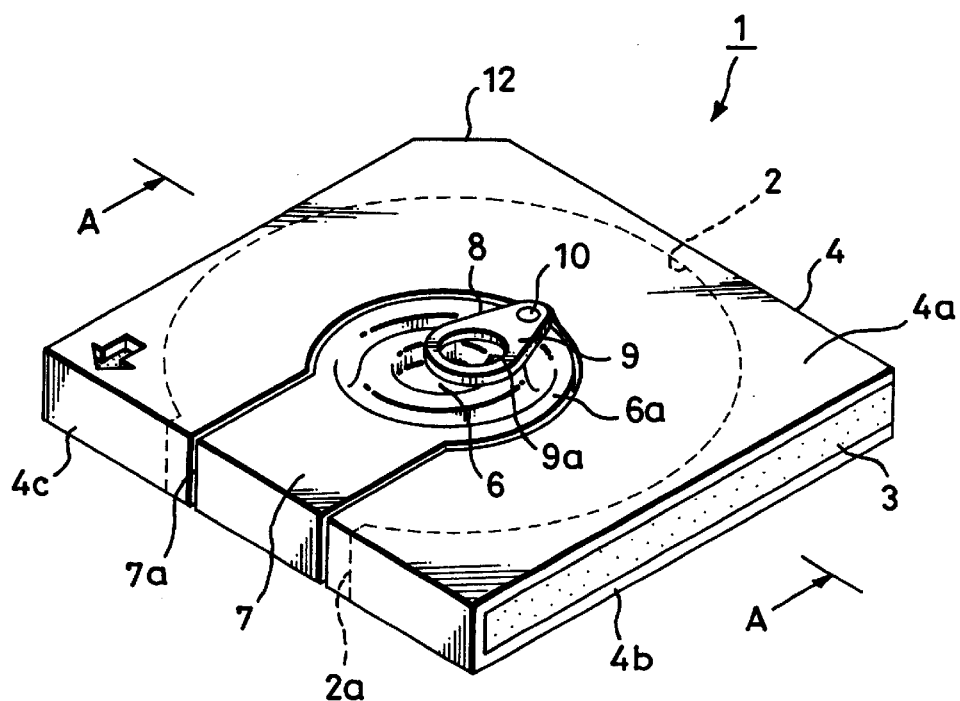
FIG. 1 is a perspective view as seen from the top surface side of a first example of the package for a disk-form recording medium according to the present invention.
Figure 2:
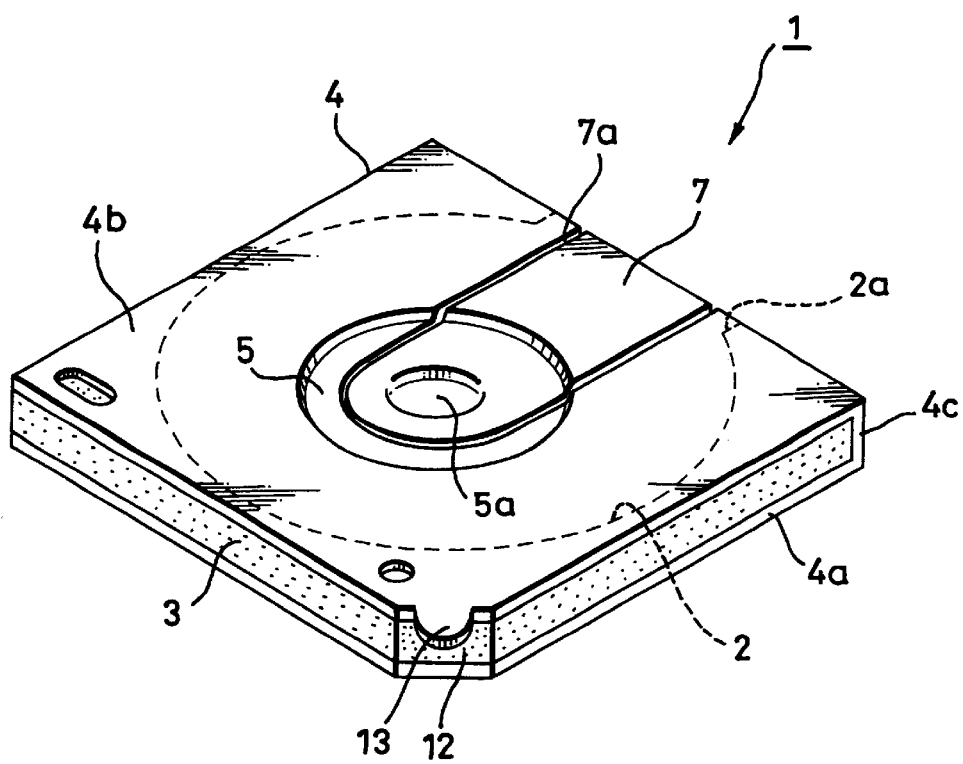
FIG. 2 is a perspective view as seen from the bottom surface side of the package shown in FIG. 1.
Figure 3:
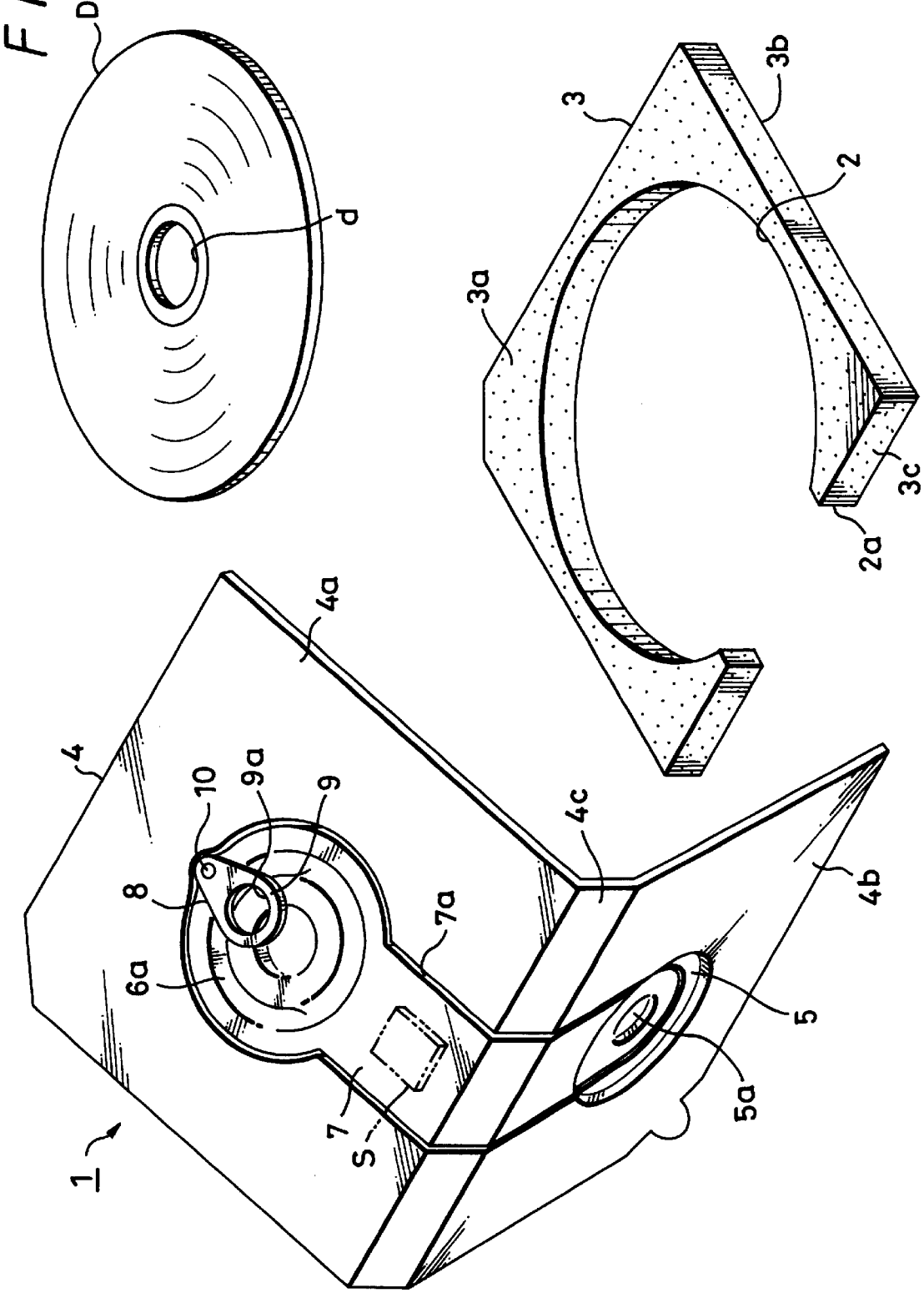
FIG. 3 is an exploded perspective view of the package shown in FIG. 1.
Figure 4:
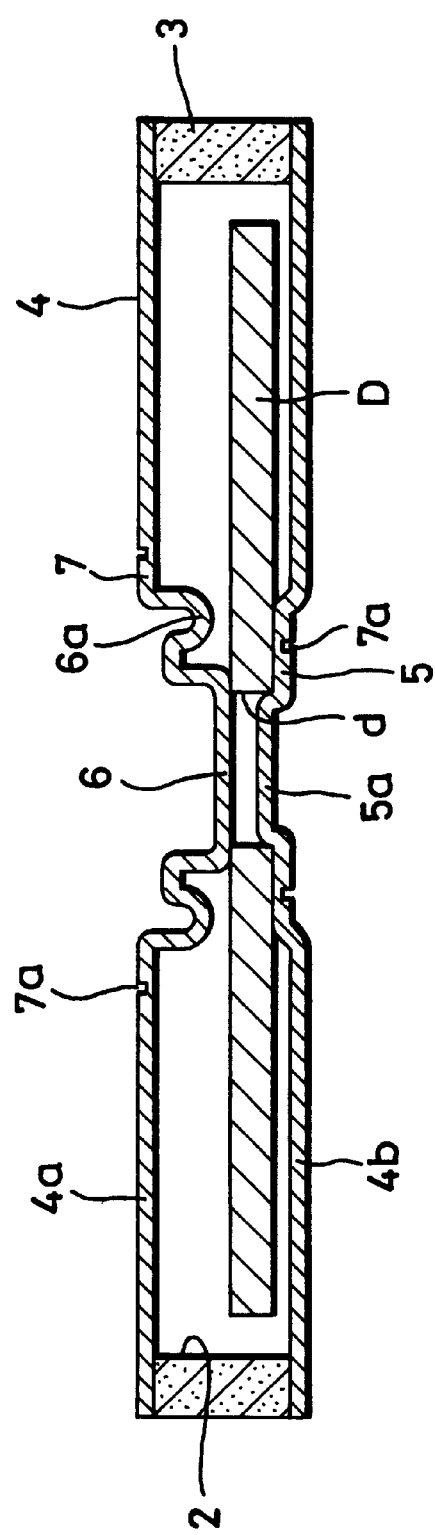
FIG. 4 is an expanded sectional view taken on line A—A in FIG. 1.
Figure 5:
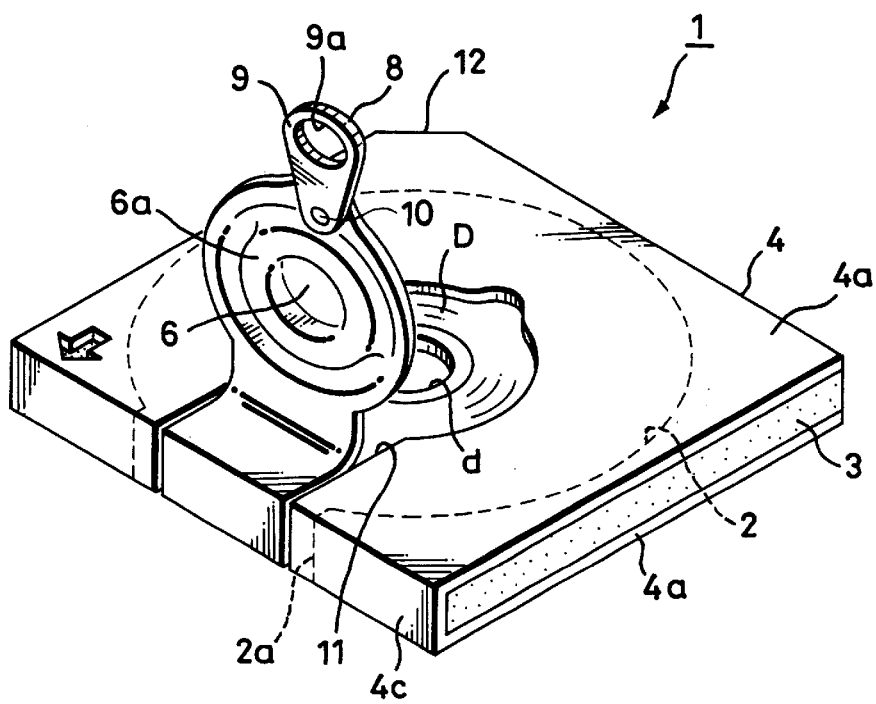
FIG. 5 is a perspective view of an application example showing the condition of detaching the detaching section of the cover of the package shown in FIG. 1.
Figure 7:
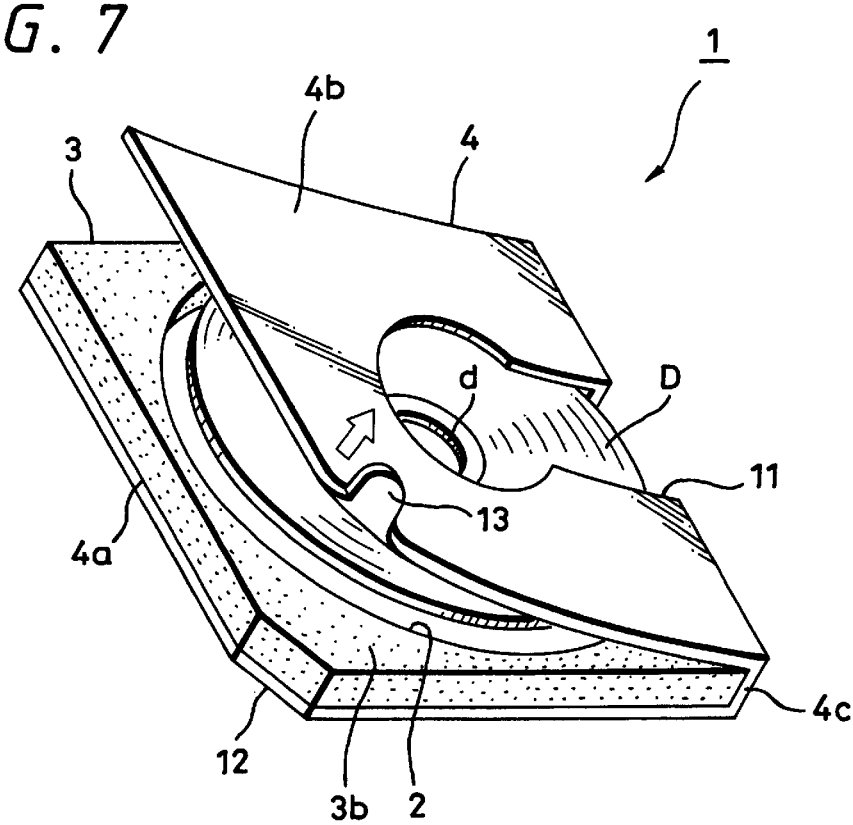
FIG. 7 is a perspective view of an application example showing the condition to peel the cover of the package shown in FIG. 1 and to take out the housed disk.
Figure 6:
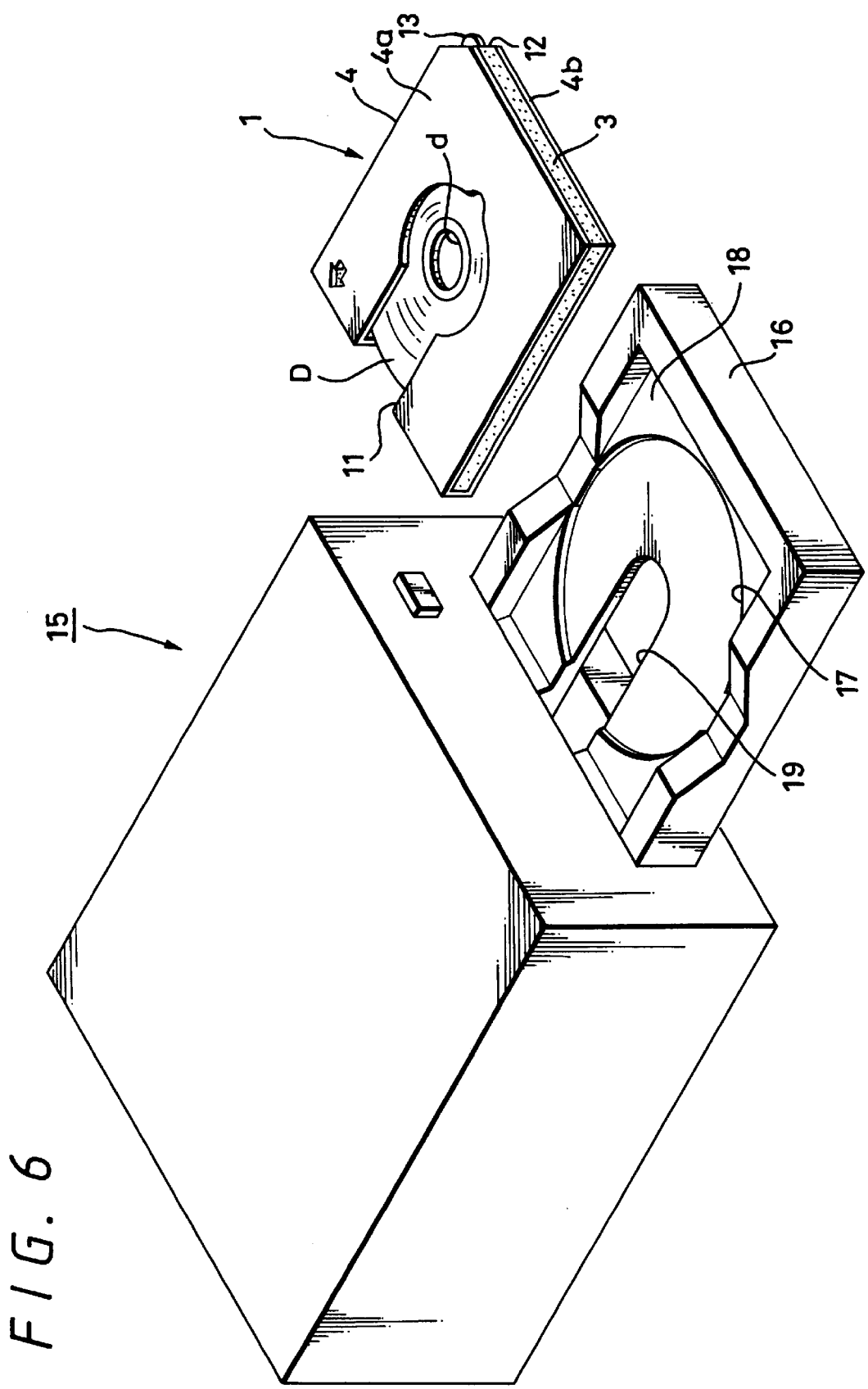
FIG. 6 is a perspective view showing the condition to detach the detaching section of the cover of the package shown in FIG. 1 and to be mounted to a recording and/or reproducing apparatus.

Referring now to the drawings, embodiments according to the present invention will be described in detail hereinafter. FIG. 1 through FIG. 7 inclusive show a first example of the package for a disk-form recording medium according to the present invention, and FIG. 1 is a perspective view as seen from the top surface side, FIG. 2 is a perspective view as seen from the bottom surface side, FIG. 3 is an exploded perspective view, FIG. 4 is an expanded sectional view taken on line A—A of FIG. 1, FIG. 5 is a perspective view of an application example showing the condition to detach the detaching section of the cover, FIG. 6 is a perspective view showing the condition to detach the detaching section of the cover and to be mounted to the recording and/or reproducing apparatus, and FIG. 7 is a perspective view of an application example showing the condition to detach the cover and take out the housed disk.

Figure 8:
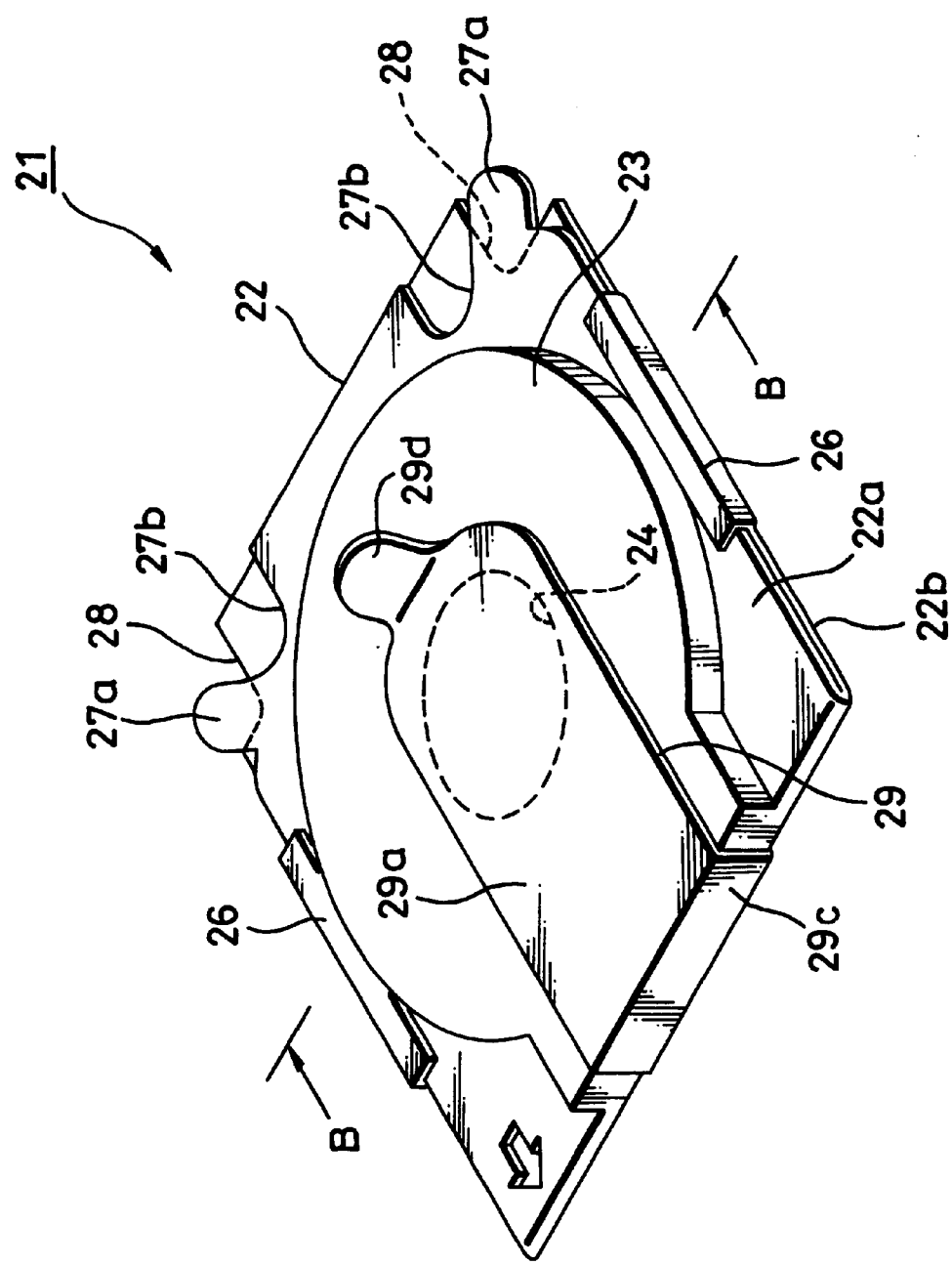
FIG. 8 is a perspective view as seen from the top surface side of a second example of the package for a disk-form recording medium according to the present invention.
Figure 9:
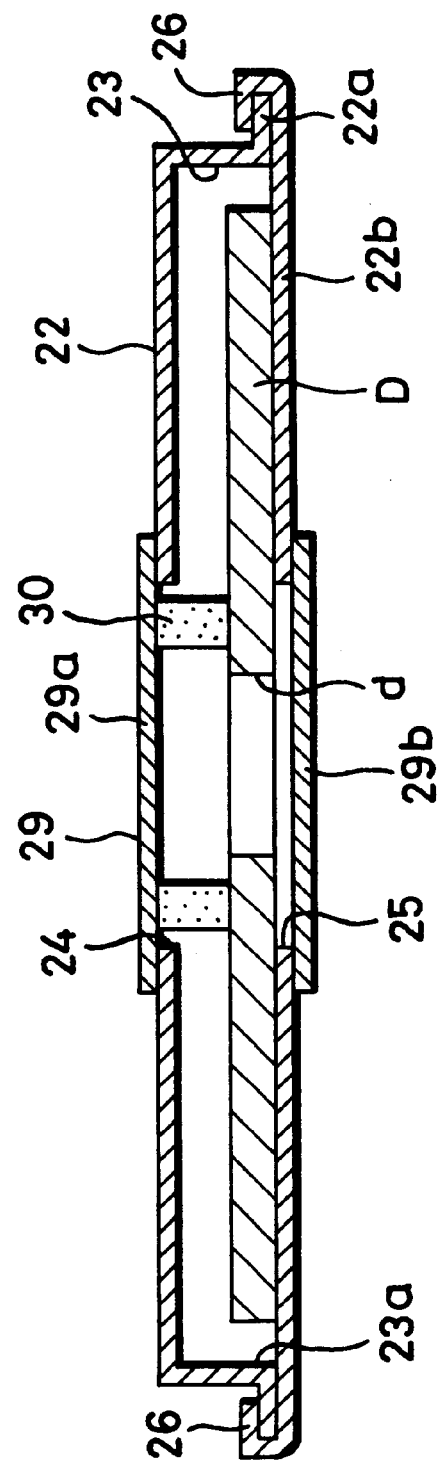
FIG. 9 is an expanded sectional view taken on line B—B in FIG. 8.
Figure 10:
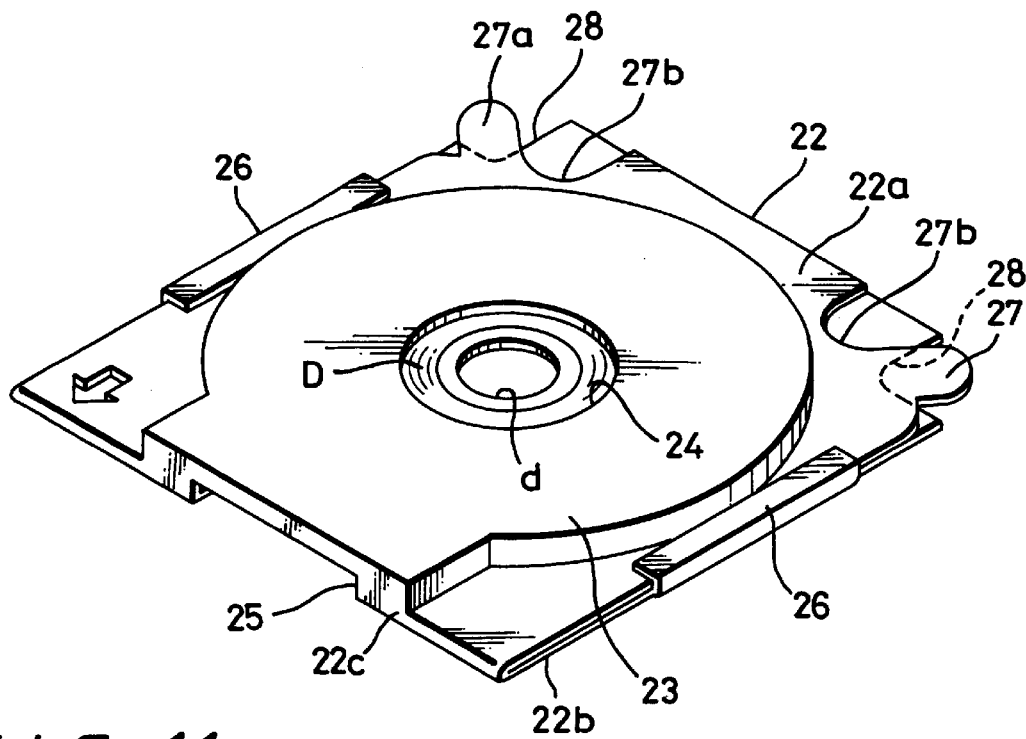
FIG. 10 is a perspective view as seen from the top surface side of the condition to peel the seal member of the package shown in FIG. 8.
Figure 11:
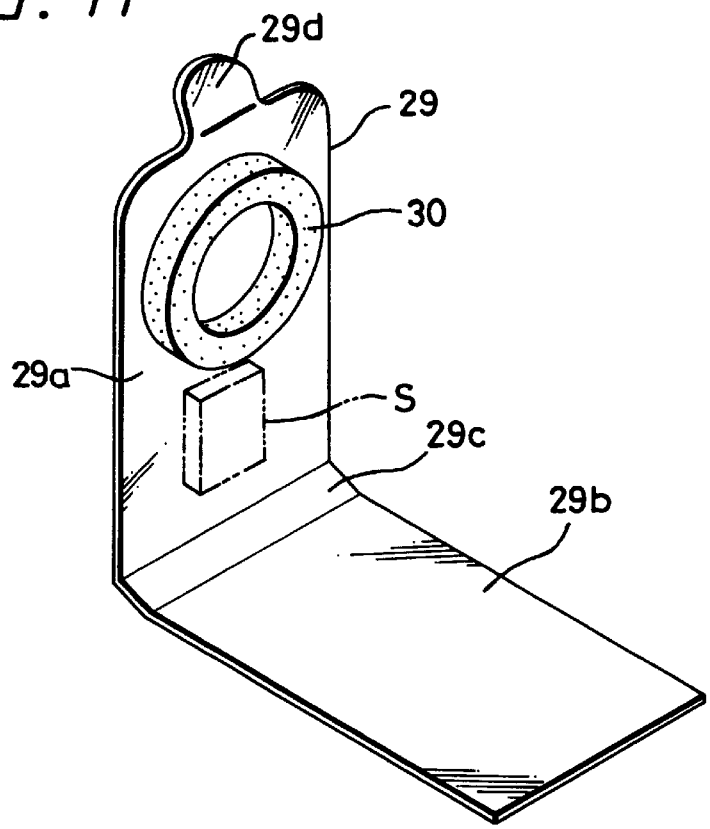
FIG. 11 is a perspective view as seen from the inner surface side of the seal member in the package shown in FIG. 8.
Figure 12:
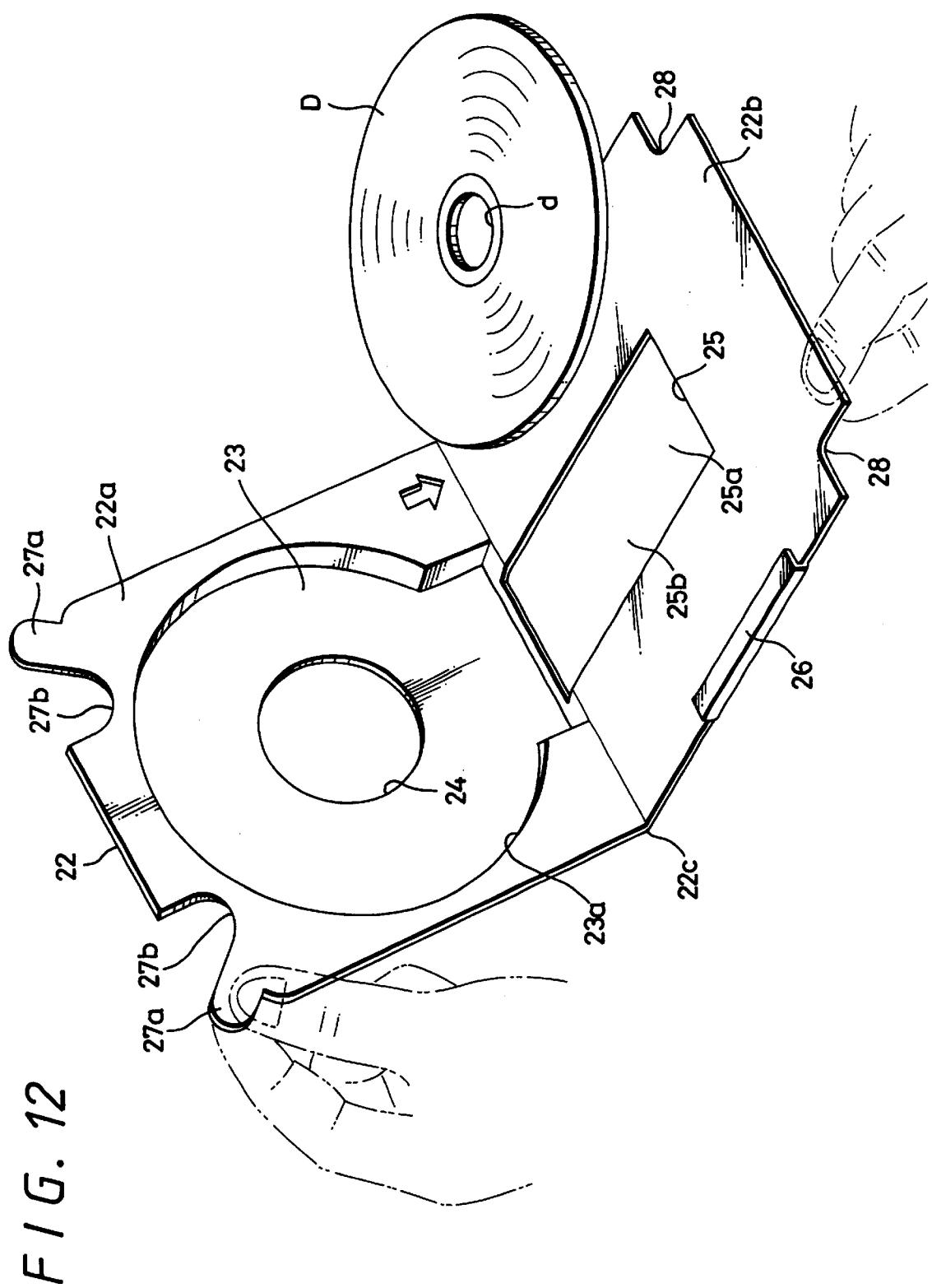
FIG. 12 is a perspective view showing the condition to separate the cover of the package shown in FIG. 8 and to take out the housed disk.

In addition, FIG. 8 through FIG. 12 inclusive show a second example of the package for a disk-form recording medium according to the present invention, and FIG. 8 is a perspective view as seen from the top surface side, FIG. 9 is a cross-sectional view taken on line B—B of FIG. 8, FIG. 10 is a perspective view of the sealing member in the peeled condition as seen from the top surface side, FIG. 11 is a perspective view of the sealing member as seen from the inner surface side, and FIG. 12 is a perspective view showing the condition to separate the cover and take out the housed disk.

Figure 13:
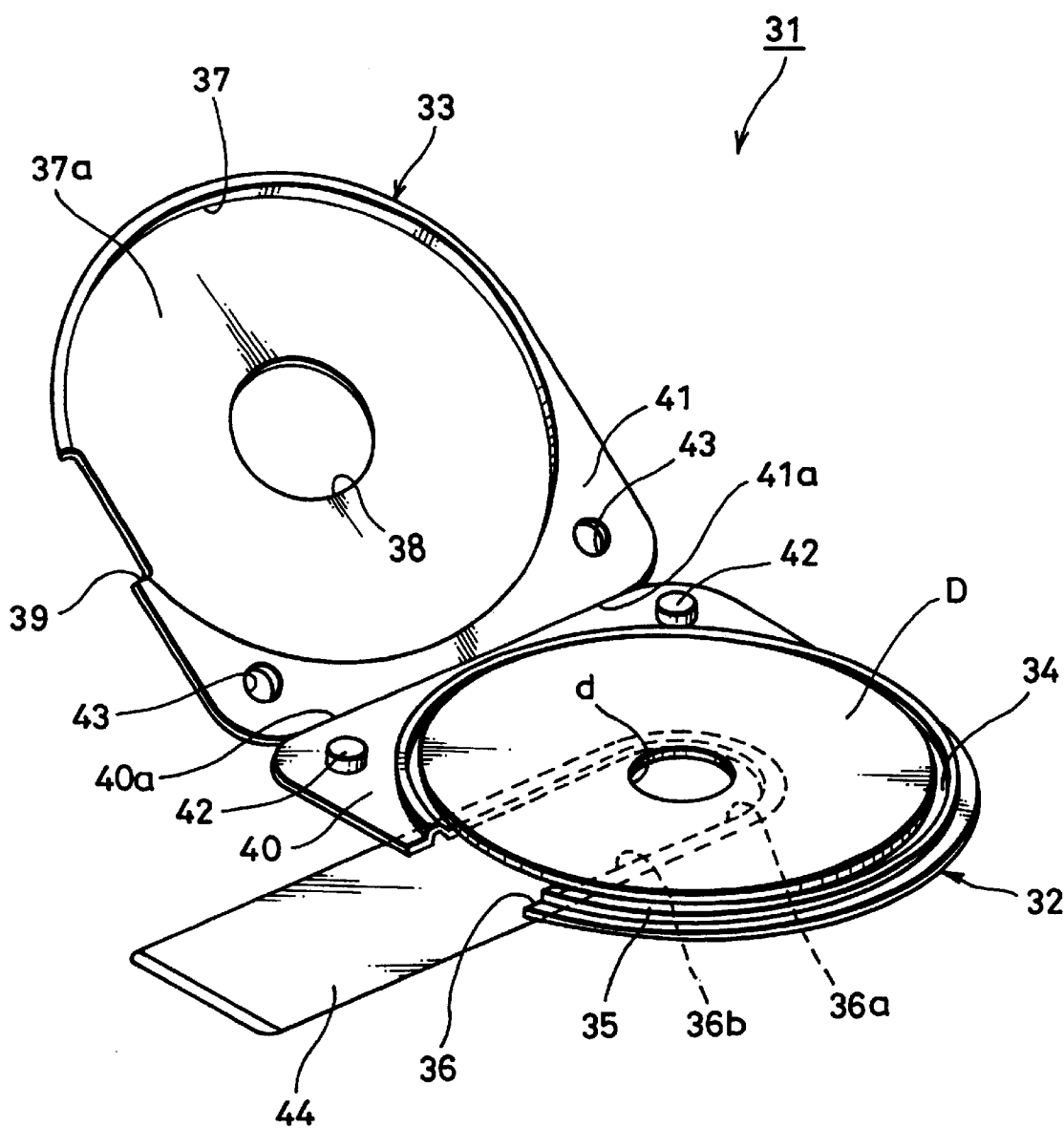
FIG. 13 is a perspective view showing the condition in which the case section of the disk case is held open as a third example of the package for a disk-form recording medium according to the present invention.
Figure 16:
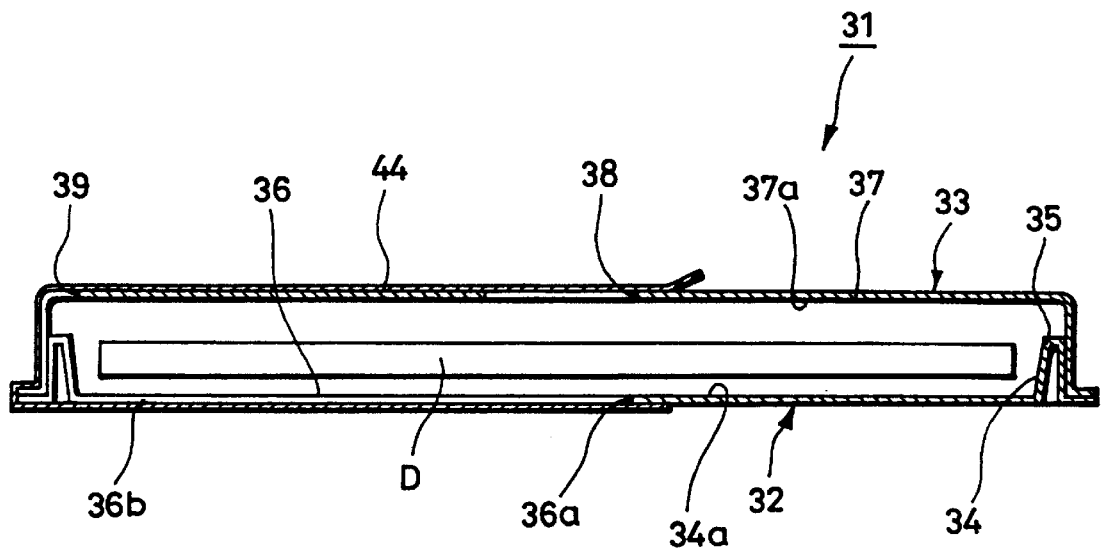
FIG. 16 is an expanded longitudinal cross sectional view taken on line C—C in FIG. 14.
Figure 17:
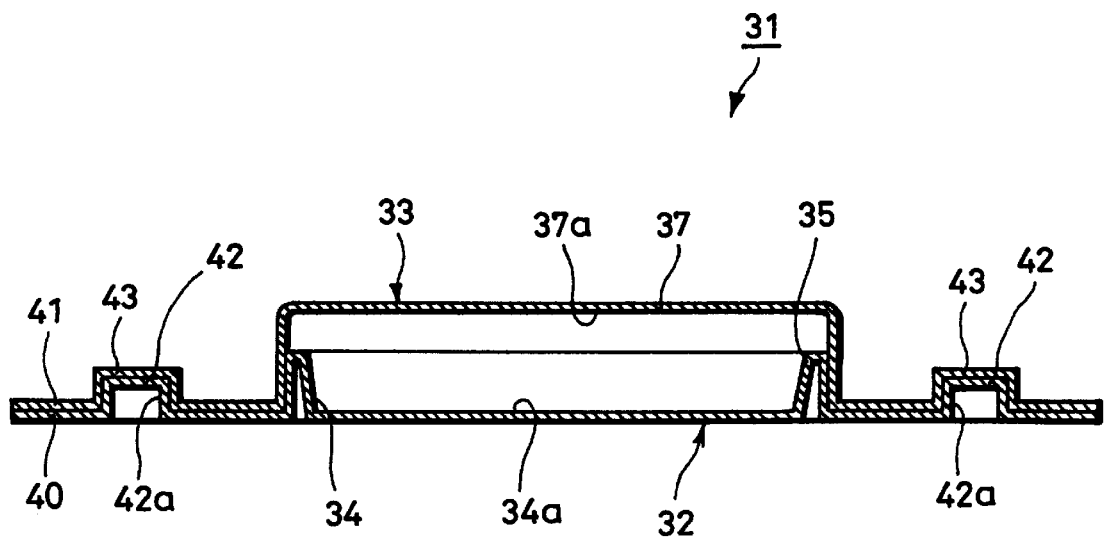
FIG. 17 is an expanded longitudinal cross sectional view taken on line D—D in FIG. 14.

FIG. 13 through FIG. 17 inclusive show a third example of the package for a disk-form recording medium according to the present invention, and FIG. 13 is a perspective view with the case section of the disk case open as a package for a disk-form recording medium, FIG. 14 is a perspective view of the case section in the closed condition, FIG. 15 is a perspective view showing the application condition, FIG. 16 is an expanded sectional view taken on line C—C in FIG. 14, and FIG. 17 is an expanded sectional view taken on line D—D of FIG. 14.

Figure 18:
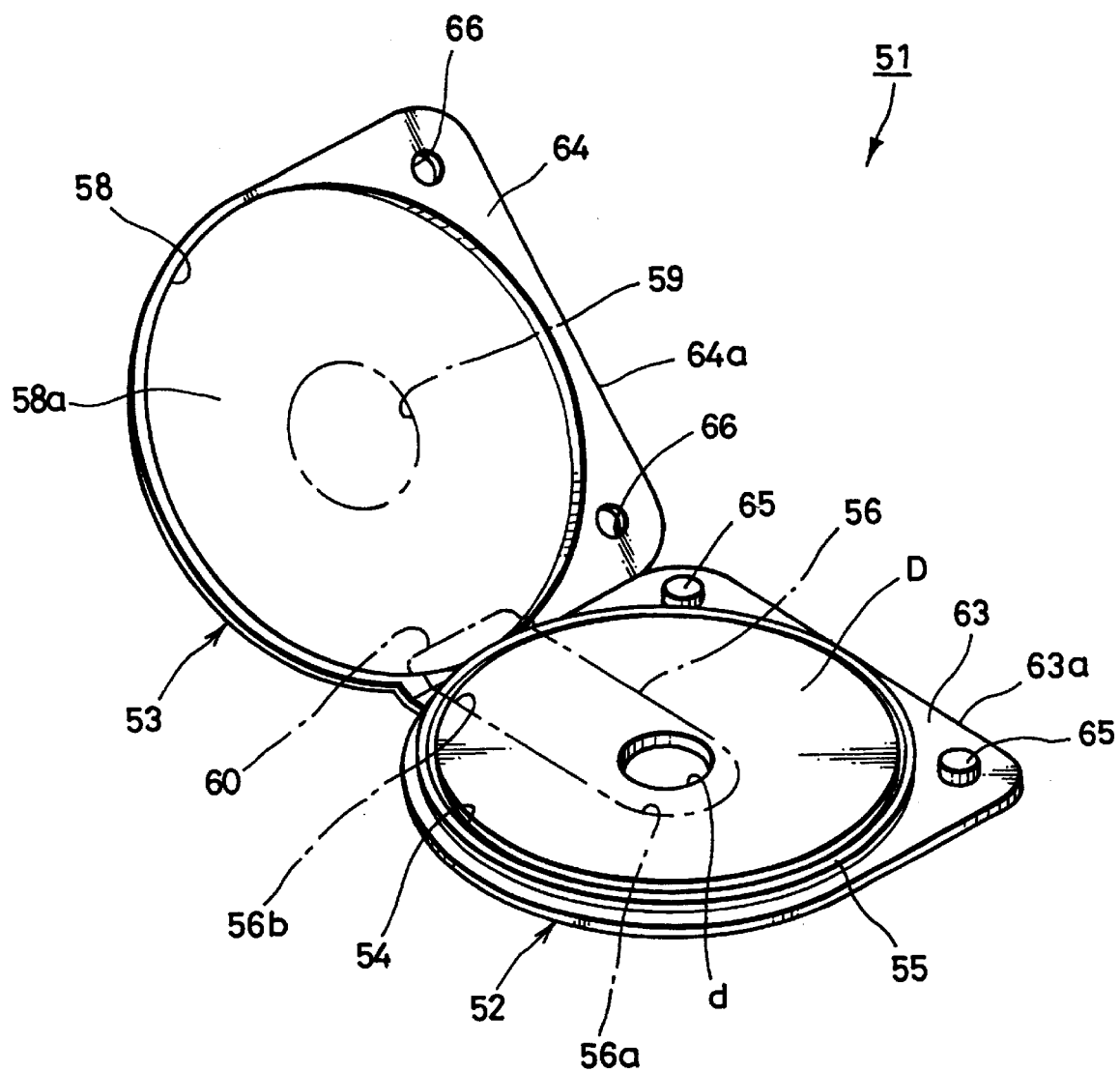
FIG. 18 is a perspective view showing the condition in which the case section of the disk case is held open as a fourth example of the package for a disk-form recording medium according to the present invention.
Figure 19:
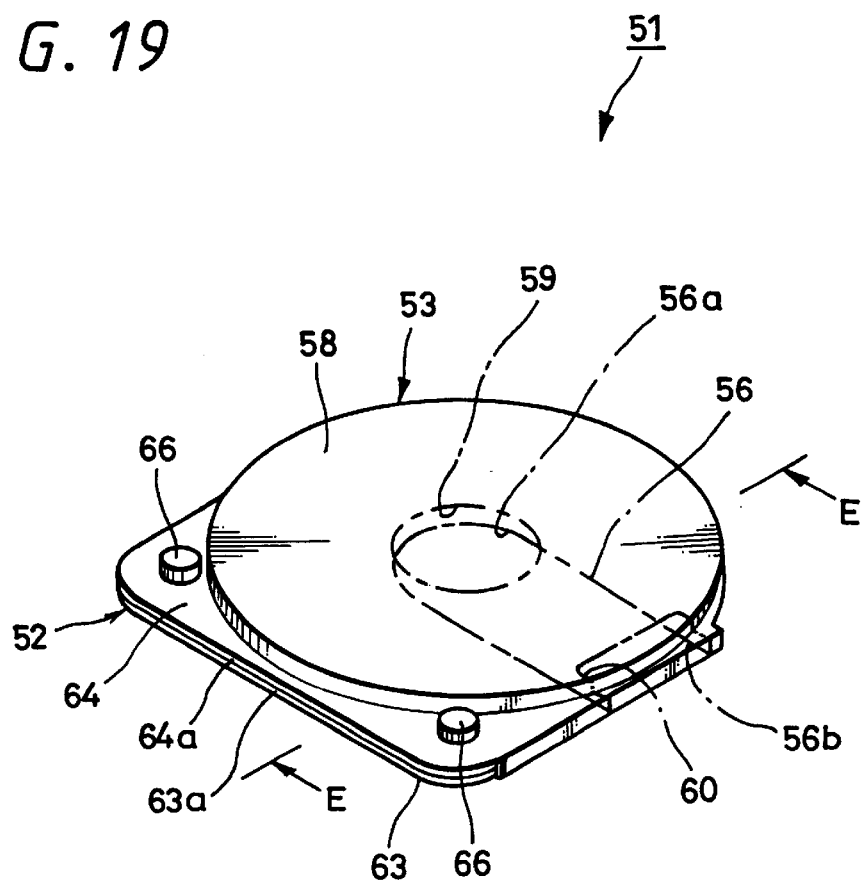
FIG. 19 is a perspective view showing the condition in which the case section of the disk case shown in FIG. 18 is closed.
Figure 20:
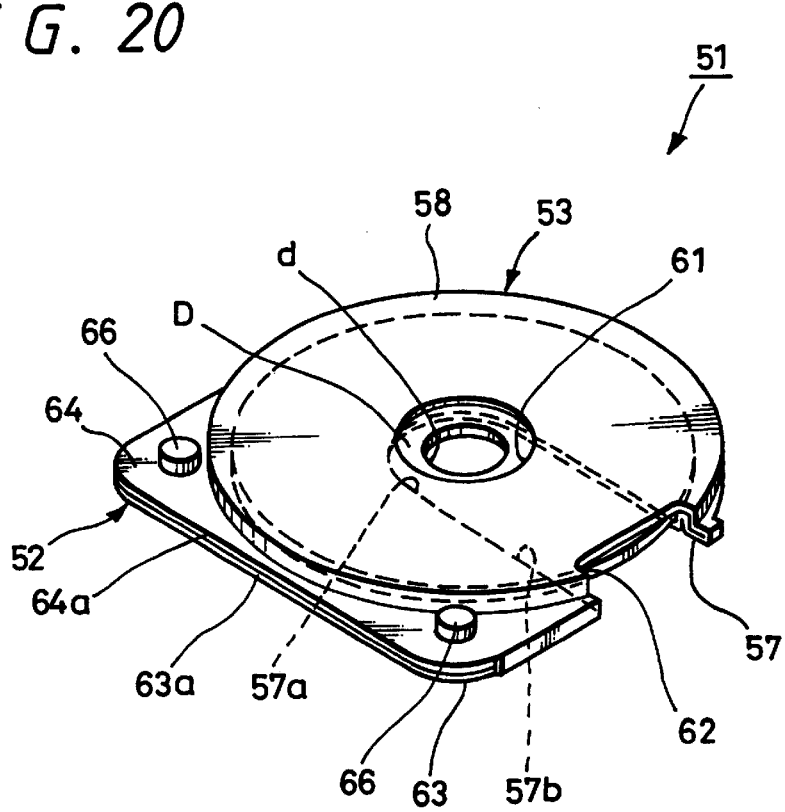
FIG. 20 is a perspective view showing the application condition of the disk case shown in FIG. 18.
Figure 21:
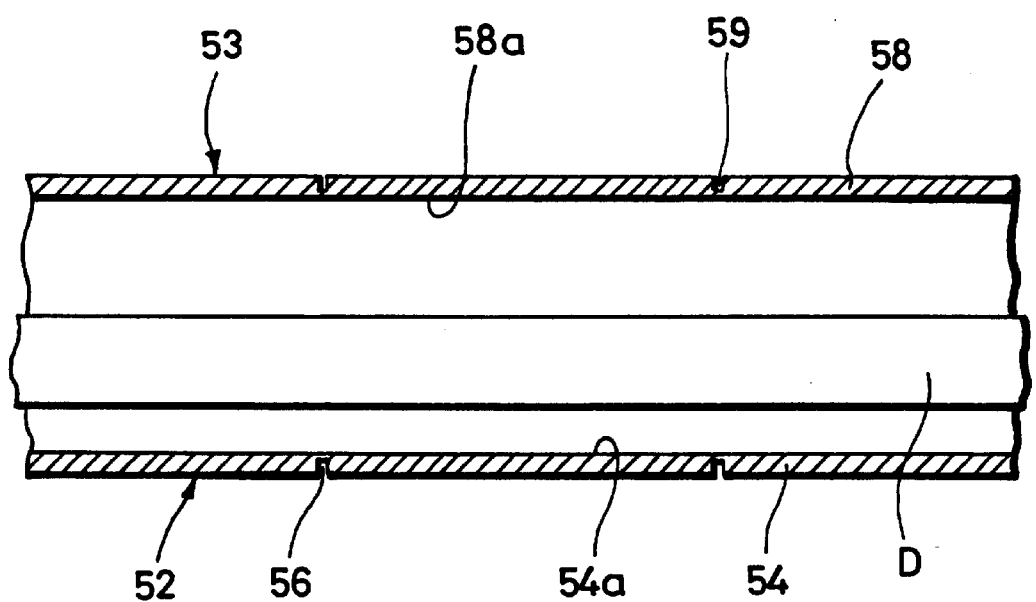
FIG. 21 is an expanded longitudinal cross sectional view taken on line E—E in FIG. 19.

FIG. 18 through FIG. 21 inclusive show a fourth example of the package for a disk-form recording medium according to the present invention, and FIG. 18 is a perspective view of the disk case as a package for a disk-form recording medium with the case section held open, FIG. 19 is a perspective view showing the case section held close, FIG. 20 is a perspective view showing the application condition, and FIG. 21 is an expanded longitudinal sectional view taken on line E—E of FIG. 19.

First of all, a package 1 for a disk-form recording medium according to the first example shown in FIG. 1 through FIG. 7 inclusive comprises a container housing 3 formed with a housing section 2, which has an inner wall of the inner diameter slightly larger than the diameter of a disk D for rotatably housing the disk-form recording medium (hereinafter called the "disk") as shown in FIG. 3 and is opened at its up and down portions. The housing container 3 is covered by a cover 4.

The housing container 3 of this package 1 is formed into a quadrilateral sheet form in the thickness greater than that of the disk D with hard sponge or plastics, etc., and with nearly its center set as a center, the above-mentioned housing section 2 is formed in a circular form open to a top and a bottom surface 3a, 3b sides, and in the nearly central portion on one side surface 3c side, an opening 2a of a required width in free communication with the housing section 2 is formed.

On the other hand, the cover 4 covers the housing container 3 from the top and bottom surfaces 3a, 3b to the one side surface 3c with the opening 2a formed and closes the top and bottom openings of the housing section 2 and the top and bottom surfaces and the side end surface of the opening 2a. The cover 4 is made of a top surface portion 4a, a bottom surface portion 4b, and a side surface portion 4c. This cover 4 may be formed with a thin plate made of polystyrene (PS), polyvinyl chloride resin (PVC), acrylonitrile butadiene styrene resin (ABS resin), polypropylene (PP), or other plastics, and this cover 4 is fixed to the housing container 3 by means of pasting or thermal welding, ultrasonic welding, fitting by means of concave and convex, etc.

This cover 4 may be formed with a metal thin plate such as a thin aluminum sheet, etc. or paper sheet such as a thick paper or plastic-coated paper other than plastic thin sheets mentioned before, but forming it with the plastic thin sheet facilitates molding of cut lines of the detaching portion, protruded portions for assembly members for restricting the housed disk, etc. described later. Furthermore, forming the cover 4 with the thin metal sheet, the cut lines of the detaching portion, protruded portions, etc. are able to be molded by pressing, producing aesthetic advantages. Forming it with the paper sheet achieves many advantages, such as light weight and low cost as well as ease of printing of contents, instructions, etc., and cut lines of the detaching section to be formed by perforation, or ease of breaking the cover plate 4 when the housed disk is taken out and so on.

The housing container 3 may be formed integral with the cover 4. For example, the portions of inner wall and the outer wall of the housing section 2 of the housing container 3 and other reinforcement ribs, etc. may be formed integral with resins such as polystyrene (PS), etc. by dividing the same into one of the surface portions or both surface portions of top and bottom surface portions 4a, 4b of the cover 4 and fabricating molds to form them into a building up profile. In such event, the gripping portion may be formed integral with the cover 4 as required, or a fitting means such as protrusions and recesses or claws may be formed on the top and the bottom surface portions 4a, 4b and assembly of the package 1 may be completed by fitting the top and the bottom surface portions 4a, 4b. Forming the housing container 3 integral with the cover 4 can reduce the number of components further and achieve still easier assembly.

On the inner surface side of the central portion of the bottom surface portion 4b of the cover 4, that is, corresponding to the central portion of the housing section 2 of the housing container 3, a stepped surface portion 5 in a diameter greater than a center hole d of the disk D housed in the housing container 3 and smaller than the inner peripheral diameter of the recording surface of the disk D is formed, and at the central portion of this stepped surface portion 5, a protruded portion 5a in a diameter slightly smaller than the center hole d of the disk D and in a thickness nearly same as that of the disk D or in height slightly smaller than that of the disk D is formed. The stepped surface portion 5 on the bottom surface portion 4b side of this cover 4 carries to support the disk D housed in the housing section 2 of the housing container 3 with the protruded portion 5a fitted and inserted into the center hole d at the central portion, and the disk D is lifted up with respect to the inner surface side of the cover 4 by being carried and supported by this stepped surface portion 5, preventing contact of the recording surface to the inner surface side as well as movement in the plane direction by fitting and insertion of the protruded portion 5a into the center hole d.

On the other hand, at the center portion of the top surface portion 4a of the cover 4, a protruded surface portion 6 in a diameter slightly greater than that of the center hole d of the disk D is formed protruded to the inner surface side via a bellows-form stretching portion 6a which is elastically expands and shinks or stretches in the orthogonal direction with respect to the top surface portion 4a on the circumferential surface portion opposite to the stepped surface portion 5 on the bottom surface portion 4b side. The protruded portion 6 on the top surface portion 4a side of this cover 4 suppresses the vertical movement of the disk D by coming in contact with the surface-side center portion of the disk D carried and supported by the stepped surface portion 5 on the bottom surface portion 4b side. By the way, the protruded surface portion 6 on the top surface portion 4a side of the cover 4 may have no stretching portion 6a formed on the circumferential surface portion but directly formed on the top surface portion 4a side. In such event, a small clearance may be generated between the same and the surface-side central portion of the disk D.

To the cover 4, a detaching section 7 is formed from the central portion of the top and bottom surface portions 4a, 4b, that is, from the stepped surface portion 5 of the bottom surface portion 4b to the outer circumference including the central portion of the side surface portion 4c and the stretching portion 6a of the protruded surface portion 6 of the top surface portion 4a. The profile of this detaching section 7 is formed by a cut-line portion 7a, and the cut-line portion 7a may be formed in the form of groove from the surface side as shown in FIG. 4, but may be formed by a train of small holes, that is, perforation. Forming this cut-line portion 7a in the form of groove as shown in FIG. 4 can hermetically seal the space where the disk D is housed, that is, the inside the housing section 2 of the housing container 3, thereby preventing entry of dust, etc. Forming the cut-line portion 7a by a so-called perforation achieves advantages of easy fabricating process, in particular, when the cover 4 is prepared by paper sheet.

To the detaching 7 formed on the cover 4 in this way, a gripping means 8 is installed. This gripping means 8 is configured by rotatably fixing a claw piece 9 with a claw fitting hole 9a to the end portion of the part surrounding the protruded surface portion 6 on the top surface portion 4a side of the cover 4 which forms one end portion of the detaching section 7 by a caulking or crimping pin 10 in the horizontal direction. To detach the detaching section 7 of the cover 4, as shown in FIG. 5, by pulling the claw piece 9 in the raising direction with respect to the top surface portion 4a of the cover 4 with the claw piece 9 rotated in the extension direction of the detaching section 7, the detaching section 7 is cut from the cut-line section 7a and an opening 11 is formed from the central portion of the top surface portion 4a of the cover 4 to the central portion of the bottom surface portion 4b via the side surface portion 4c.

The opening 11 with the detaching section 7 of the cover 4 removed is formed to have a U shaped cross section with respect to the disk D to be housed in the housing section 2 of the housing container 3, the disk D is exposed from the central portion of the vertical surface to a part of the disk surface, and the vertical central portion of this opening 11 corresponds to the opening for disk drive facing the center hole d of the disk D and its circumferential portion, and the intermediate portion between these central portions becomes an opening for recording and/or reproducing which corresponds to the opening 2a of the housing section 2 of the housing container 3 and allows a part of the recording surface of the disk D to be faced in the radial direction.

That is, the portion corresponding to the side surface portion 4c of the cover 4 is an opening for enabling the recording and/or reproducing head apparatus to easily approach the recording surface of the housed disk D in the opening 11 with the U shaped cross section with the detaching section 7 of the cover 4 removed, and the central portion of the top surface portion 4a is an opening for disk-chucking, and the central portion of the bottom surface section 4b is an opening for rotating the disk. And the opening of the vertical surface between openings at the central portions of the top and bottom surface portions 4a, 4b is the opening for traveling of the magnetic head and optical head, which are top and bottom heads, and the disk is held vertically with these two heads for recording, for example, in the case of disks of the magneto-optic recording system such as MD (mini-disk), etc.

Because the opening 11 is continuously formed from the top and bottom surface sections 4a, 4b to the side surface section 4c by removing the detaching section 7 of the cover 4, an opening is formed at the top surface section 4a even when the head on the top surface side is not required, but in such event, it may be possible that the width of the intermediate opening of the top surface section 4a is reduced.

Because the protruded surface portion 6 as a suppressing section for suppressing the vertical movement in the vertical direction of disk D is also removed by removing the detaching section 7 of the cover 4, the disk D to be housed in the housing section 2 of the housing container 3 becomes rotatable freely.

To record and/or reproduce the disk D housed in the package 1 with the detaching section 7 of the cover 4 detached in this way, for example, the disk D should be mounted to a recording and/or reproducing apparatus 15 shown in FIG. 6. To this recording and/or reproducing apparatus 15, a disk tray 16 is equipped in such a manner free to come in and come out, and on the carrier surface section of the bottom surface of this disk tray 16, a circular recess 17 and a rectangular recess 18 with a level difference of a required height provided around the circular recess 17 are formed, and an opening 19 is formed from the central portion to the inner end portion of the carrier surface section. The disk tray 16 formed in this way is intended to carry the disk D with the disk D housed in the package 1 or in the naked condition where the disk D is taken out from the package 1. That is, in the case of the disk D housed in the package 1, as described above, the package 1 in which the detaching section 7 of the cover 4 is detached to open the opening 11 is carried and mounted in the fitted form with the package 1 brought to correspond to the rectangular recess 18 and the opening 11 brought to correspond to the opening 19 of the disk tray 16, and in the case of naked disk D where the disk is taken out from the package 1 or the like, the disk D is directly carried and mounted onto the circular recess 17 of the disk tray 16.

The package 1 is configured such that the cover 4 is peeled off with respect to the housing container 3 to open the housing section 2, and the housed disk D can be taken out. Consequently, in this example, as shown in FIG. 7, one corner on the side end that faces each other the side surface section 4c of the top and bottom surface sections 4a, 4b of the cover 4 is cut diagonally together with the housing container 3 and is formed into an inclined corner portion 12, and a gripping piece 13 is protrudably formed on the bottom surface section 4b side of the cover 4 of this inclined corner portion 12.

To take out the housed disk D from this package 1, grasping and pulling up the gripping piece 13 formed on the inclined corner portion 12 side of the bottom surface section 4b of the cover 4 peels the lower surface section 4b of the cover 4 from the housing container 3 and releases the bottom surface side opening of the housing section 2 of the housing container 3 to thereby enable the housed disk D to be taken out as shown in FIG. 7.

As described above, in this example, the bottom surface section 4b side of the cover 4 is intended to be peeled from the housing container 3, but the upper surface portion 4a side may be intended to be peeled, and the cut-line section 7a for detaching the peeling section 7 of the cover 4 may be provided away from the detaching section 7 to the extent that enables the disk D in the housing section 2 of the housing container 3 to be taken out.

In this example, the gripping piece 13 for peeling the cover 4 with respect to the housing container 3 is formed by being located at the corner 12, but what is important is that the disk D inside the housing section 2 of the housing container 3 is able to be taken out, and it may be configured that the top surface section 4a or the bottom surface section 4b of the cover 4 is torn horizontally. That is, with the disk D taken out from the package 1 once, the package 1 is not needed to be reused, and an opening is made on the package 1 as a result of breakage so that the disk D is able to be taken out.

As described above, in the first example, the package 1 is intended to hermetically seal and house the disk D in such a manner to prevent damage by movement of the disk D inside the package 1 in transit. And in order for a user to record and/or reproduce the disk D housed in the package 1, the user must detach and take out the detaching section 7 from the cover 4 right before the use, and with the opening 11 formed and with the disk D housed, the user should mount the package 1 to the recording and/or reproducing apparatus 15 as described above.

Because the user does not need to take out the disk D from the package 1, house the disk D once in the disk tray, and mount it to the recording and/or reproducing apparatus as described above, the user is free of fear of causing fingerprints or dust to adhere to the disk D or can eliminate troubles to take out the disk D from the package and house it to the disk caddie, and can carry out recording to the disk D rapidly.

In addition, the user is able to reproduce the disk D housed in the package 1 after recording in the disk D, but since the user is able to easily take out the recorded disk D from the package 1, the user is able to reproduce the disk D by other apparatus. In addition, the package 1 after the disk D is taken out is discarded without recycling, but this package 1 has an extremely simple construction as described above and is able to be produced at low cost, resulting in less burden.

For example, the package 1 is formed into a cartridge form for a MD (mini-disk) and is able to be used as a very inexpensive MD cartridge containing an MD (mini-disk).

The package for the disk-form recording medium configured as described above may have some air circulated between the inside and the outside of the package 1 or may be completely hermetically sealed.

When air is allowed to circulate between the inside and the outside of the package 1, the cut-line section 7a of the detaching section 7 formed on the cover 4 of the package 1 is formed in a train of small holes, that is, a so-called perforation, or the housing container 3 is formed with porous sponge-like material. Also, it may be possible that a clearance is formed on the affixed surface portion between the housing container 3 and the cover 4 to enable air to circulate between the disk housing section 2 of the housing container 3 and the outside, and in such event, a groove-form line may be formed in free communication with the inside and the outside of the affixed surface portion of the housing container 3 or a plurality of clearances in free communication with the inside and the outside of the affixed layer that affixes the housing container 3 to the cover 4 are formed to secure the air passage.

Forming the package 1 in such a manner to allow a little air to circulate between the inside and the outside can stably house and hold the disk D without expansion or contraction of the package resulting from the entry of air even when there exists any temperature difference or atmospheric pressure difference inside and outside the package in the process for housing and sealing the disk D in the package 1 at the time of manufacture or during transportation, for example, by aircraft. In such event, the package 1 may be constructed to prevent entry of dust even if air is circulated by adjusting the size of pores of the sponge-like material on the housing container 3 side, the perforation on the cover 4, the grooveform line between the housing container 3 and the cover 4, clearance of adhesive layers, etc.

When the inside of the package 1 is hermetically sealed, the cleanliness of air inside must be taken into account. The cleanliness that would not affect at least recording is required in accordance with the recording density of the disk D as a disk-form recording medium to be housed and the spot diameter on the surface of the disk D of the optical head for recording and/or reproducing. Generally speaking, the cleanliness corresponds preferably to at least Class 1000 or lower, and more suitably to Class 100 or lower. By the way, Class 100 means the air containing 100 pieces or less particles (dust) of 0.5 $\mu$m or larger per 1 cubic feet.

Enclosing clean air in the housing section 2 of the housing container 3 of the package 1 achieves an effect to holding the surface free of dust adhesion before the housed disk D is put in used.

The dry air may be sealed in the package 1, and in such event, chemicals such as desiccant, etc. may be enclosed inside. When chemicals such as desiccant, etc. are enclosed, the desiccant may be removed simultaneously when the detaching section 7 is detached from the cover by placing the chemical S such as desiccant, etc. integrally with the detaching section 7 of the cover 4 of the package 1 as shown by a two-dot chain line in FIG. 3.

Filling the inside of the package 1 housing the disk D with dry gas in this way can prevent proliferation of molds, etc. on the surface of the disk D, and in addition, in the case when the disk D is somewhat influenced by water content, the influence can be prevented at least until the detaching section 7 is detached to form the opening 11 at the cover 4. In addition, by removing the desiccant simultaneously and integrally with the detaching section 7, it is possible to remove the chemicals such as desiccant, etc. nor required for the use of disk D and to use the disk safely without any fear of occurrence of accidents such as scattering of desiccant, etc. while the disk D is in rotation.

In addition, inert gas may be enclosed in the package 1, and in such event, a deoxidizer may be enclosed in the inside. When the deoxidizer is enclosed, as similarly in the case of enclosing the desiccant mentioned before, it is possible to remove the deoxidizer simultaneously when the detaching section 7 is detached by placing the deoxidizer integrally with the detaching section 7 of the cover 4 of the package 1.

Filling the inside of the package 1 with the disk D enclosed with inert gas can prevent proliferation of molds, etc. on the disk D surface, and for those in which the disk D is oxidized or affected by oxygen, this chemical reaction may be prevented, at least, before the detaching section 7 is detached and the opening 11 is formed in the cover 4. In addition, by removing the deoxidizer simultaneously and integrally with the detaching section 7, the chemical S such as deoxidizer, etc. not required for the use of disk D can be removed from the package 1, and the disk D is able to be used safely without any fear of occurrence of accidents such as scattering of desiccant, etc. while the disk D is in rotation.

Referring now to FIG. 8 through FIG. 12 inclusive, a package for a disk-form recording medium as a second example will be described in detail hereunder.

A package 21 for a disk-form recording medium shown in FIG. 8 through FIG. 12 inclusive is configured by integrally forming the housing container and the cover, in which on an upper cover 22a of a double-folded form cover 22 formed by a plastic thin sheet such as polystyrene (PS), polyvinyl chloride (PVC), acrylonitrile, butadiene, styrene resin (ABS resin), polycarbonate (PC), etc., a housing container 23 swelling in a flat cylindrical form with an inner diameter slightly larger than the diameter of the disk D to be housed is formed, a bottom cover portion 22b is flat and is superimposed over the inner surface side of the top cover portion 22a to close an opening 23a of the housing container 23.

At the central portion of the housing container 23 formed on the top cover portion 22a of the cover 22 of the package 21, an opening 24 for chucking of the housed disk D is formed, and to the bottom cover portion 22b, an opening 25 is formed from the central portion of the housing container 23 opposite to the opening 24 for chucking to one side portion, a side portion 22c for connecting the top cover portion 22a in this example. The opening 25 of the bottom cover portion 22b has the portion opposite to the chucking opening 24 of the housing container 23 designated to an opening 25a for disk drive and the portion from the end side of the opening 25a for disk drive to the outside end of the opening 25 designated to an opening 25b for recording and reproducing.

On edges of both sides of the bottom cover 22b of the cover 22, engaging or latching fixing pieces 26, 26 grasped and latched to the side edge portions of the overlapped top cover portion 22a are bend-formed in the folded form, and the cover 22 is folded into two and fixed with the cover portions 22a, 23b on top and bottom sides superimposed each other. On both corners of the open side facing the connection side 22c of the top cover portion 22a, grips 27a, 27a for peeling are formed by notches 27b, 27b, and on both corners of the open side of the bottom cover portion 22b corresponding to the grips 27a, 27a, notches 28, 28 are formed, respectively.

And the top and bottom openings of the package 21, that is, the chucking opening 24 of the top cover portion 22a of the cover 22 and the opening 25 on the bottom cover portion 22b thereof are configured to be closed with a removably sealed sealing member 29. This sealing member 29 comprises a top surface section 29a corresponding to the upper portion 22a side of the cover 22, a bottom surface section 29b corresponding to the lower cover portion 22b side and a side surface portion 29c corresponding to the connection side portion 22c, and on the required portion on the inner surface side opposing the cover 22 side, an adhesive is affixed to be removal with respect to the cover 22 side.

On the sealing member 29, a gripping piece 29d is formed integral with the end portion of the top surface portion 29a, and to the top half side inner surface of this top surface portion 29a, a disk moving blocking or chucking member 30 is fixed opposite to the chucking opening 24 on the housing container 23 side as shown in FIG. 9 and FIG. 11. The disk moving chucking member 30 is formed of a doughnut-like sponge material in diameter slightly smaller than the inner diameter of the chucking opening 24.

The package 21 of the second example configured as described above houses the disk D in the housing container 23, overlaps the top and the lower cover portions 22a, 22b of the cover 22 and fixes them with latching stopping pieces 26, 26, and affixes the sealing member 29 to the outer surface side of the cover 22 with the opening of the housing container 23 closed by inserting the disk moving chucking member 30 into the chucking opening 24 of the housing container 23, seals the chucking opening 24 and the opening 25 on the lower cover portion 22b side, and then, houses and encloses the disk D. The disk D is retained with the disk moving chucking member 30 inside the housing container 23 of the package 21 in this way and is stably held with the movement suppressed.

And since the package 21 of the second example configured in this way is formed with one piece of sheet material, the cost is reduced and a disk housed in a very inexpensive package is able to be provided.

To record and/or reproduce the disk D housed in the package 21 in this way, the package 21 is mounted to the recording and/or reproducing apparatus as in the case of the package 1 of the first example with the seal member 29 peeled from the cover 22 and the chucking opening 24 and the opening 25 on the bottom cover portion 22b side open. When the recording and/or reproducing is stopped midway and the package 1 is pulled out from the apparatus, affixing the sealing member 29 to the cover 22 side as before houses and holds the disk D under the hermetically sealed condition again. For the adhesive of the sealing member 29, by using an adhesive which disables re-adhesion after the sealing member is once peeled, the seal member 29 serves as in the case of the detaching section 7 in the package 1 according to the first example.

After the disk D is recorded, the disk D is able to be removed from the package 21. That is, as shown in FIG. 12, the housing container 23 is opened and the disk D is able to be taken out by separating the top and lower cover portions 22a, 22b against the fixing force by the latch-fixing pieces 26, 26 with the knobs 27a, 27a on the upper cover portion 22a side of the cover 22 grasped through the notches 28, 28 on the lower cover portion 22b side as well as with the end edge portion of the lower cover portion 22b grasped through notches 27b, 27b on the upper cover portion 22a side. The taken out disk D is able to be mounted to another apparatus for reproduction.

In addition, because the package 21 according to this example has no portion to break even if the disk D is taken out, the package 21 is able to be reused by housing a disk D and reassembling, achieving economical advantages.

In the package 21 according to the second example, the cover 22 is fabricated by making the upper and the lower cover portions 22a, 22b integral in the same thickness, but both cover portions 22a and 22b may have thickness varied, respectively; for example, the upper cover portion 22a is made thin and the lower cover portion 22b is made slightly thicker, or the cover portion 22a and 22b of upper and lower sides may be fabricated with different parts, for example, with different materials.

It is also possible to use the seal member 29 in the package 21 of the second example in place of the detaching section 7 of the package 1 of the first example, or conversely, the detaching section 7 of the package 1 of the first example may be adopted to the portion for affixing the seal member 29 of the package 21 of the second example.

The package 21 of the second example configured as described above may have a construction to enable a little air to circulate in the package inside as described above, or may have a construction to hermetically seal the package, and in the package 21 of this second example, in order to allow a little air to circulate, perforation may be formed in the seal member 29 or small holes are formed on the circumferential surface of the housing container 23 or groove-form lines, etc. that connect the inside and the outside may be formed on the joint surface of the upper and the lower cover portions 22a, 22b. By employing a construction to allow a little air to circulate the package 21, unrequired bulge or contraction of the package 21 can be prevented as in the case previously described.

When the package 21 is hermetically sealed, as similar is the case of the package 1, chemicals such as desiccant, etc. may be enclosed, and in such event, as shown with the two-dot chain line in FIG. 11, the chemical seal S such as desiccant, etc. is placed integrally with the seal member 29 and is removed integrally with the seal member 29. When the deoxidizer is enclosed in the package 21, the deoxidizer is placed integrally with the seal member 29 so that the deoxidizer is able to be removed integrally with the seal member 29.

Employing a hermetically sealed construction for the package 21 and enclosing chemicals such as desiccant, deoxidizer, etc. can prevent proliferation of molds, etc. on the housed disk surface as in the case of the above-mentioned example, and since the chemicals, etc. are able to be integrally removed with the seal member 29, they can be used safely without any fear of unrequired scattering inside the package or any interference with rotation of the housed disk.

FIG. 13 through FIG. 17 inclusive show the package for a disk-form recording medium of the third example (hereinafter called the "Disk Case"). A disk case 31 of this example comprises a first case section 32 that serves as a package (hereinafter called the "Case Proper") for covering the recording surface side which is one surface side of an optical disk D such as a CD-R or a DVD-RAM, etc., and a second case section 33 that serves-as a cover for covering a label surface side which is the other surface side of the optical disk D. The first case section 32 has a disk housing section 34 with a diameter slightly larger than that of the optical disk D formed in a concave form by a protruding edge 35 of a circumference form, and from the center to one side edge in a plane 34a of the disk housing section 34, a notch opening 36 with an inner end edge in the form of arc is formed in a required width, and this opening 36 has an inner half side 36a serving as an opening for disc rotation and an outer half side 36b serving as an opening for head insertion.

On the other hand, to the second case section 33, a cover 37 that-corresponds to the disk housing section 34 of the first case section 32 is formed in a circular concave form in such a manner as to fit to the disk housing section 34 at the outer circumference side of the protruding edge 35. At the center of a plane 37a of the cover 37, a circular-form disk rotation opening 38 that is opposite to the inner half side 36a for disk rotation opening of the opening 36 of the disk housing section 34 is formed, and on one side of this cover 37, concave form gripping opening 39 is formed in correspondence with the outer edge portion of the outer half side 36b of the opening 36 of the disk housing section 34.

The first case section 32 and the second case section 33 are connected at one side edge portion so as to be able to open and close. That is, in one side section of the first and the second case sections 32 and 33, nearly square-form edge surface portions 40, 41 are formed opposite to each other in continuation from the disk housing section 34 and the cover 37, and edge surface portions 40 and 41 are connected in the form of a hinge at linear side end edges 40a and 41a parallel to the opening 36 on the disk housing section 34 side. To the edge surface sections 40 and 41, engaging or latching sections 42 and 43 which can be engaged and disengaged each other are installed.

The latching section 42 on the first case section 32 side is formed in a circular convex form, while the latching section 43 on the second case section 33 side is formed in a circular concave form to which the latching section 42 fits in, thereby making the latching section 42 on the first case section 32 side in a circular concave form as seen from the outer surface side, and this concave section 42a forms a positioning section. By the way, the latching section 43 on the second case section 33 side may be formed in a penetrating hole form into which the latching potion 42 is inserted.

The disk case 31 of the third example configured as above may be molded by compressed air forming or compression forming by film material of transparent or semi-transparent thermoplastic resin such as styrene-based resin such as polypropylene (PP), polystyrene (PS), etc. or ethylene-based thermoplastic resins, etc. and the housed disk is able to be seen through.

To house the optical disk D in the disk case 31, first of all, disengage the first case section 32 and the second case section 33, house the optical disk D in the disk housing section 34 of the first case section 32 in such a manner to be placed on the plane 34a, and the second case section 33 is closed with the first case section 32 under this condition to bring the cover 37 to correspond to the disk housing section 34, and fitted at the outer circumferential side of the protruded edge 35 and the latching sections 42 and 42 are latched together, thereby the first case section 32 and the second case section 33 are joined with the edge surface sections 40 and 41 superimposed and brought in close contact to each other, and the optical disk D is thereby housed and held. The center hole d of the optical disk D under this condition is brought to correspond to the inner half side 36a of the opening 36 on the first case section 32 side and the disk rotation opening 38 on the second case section 33 side as shown in FIG. 15.

A seal 44 with adhesives is peelably pasted and sealed to the area from the opening 36 on the first case section 32 side to the gripping opening 39 and the disk rotation opening 38 on the second case section 33 side as shown in FIG. 14 and FIG. 16 with the optical disk D being housed in the disk case 31 in this way to hold the optical disk D under the hermetically sealed condition.

When the optical disk D held in the hermetically sealed condition in the disk case 31 is used, the seal 44 is peeled, the opening 36 on the first case section 32 side, the disk rotation opening 38 and the gripping opening 39 on the second case section 33 side are released as shown in FIG. 15, and the optical disk D is mounted to the information recording reproducing apparatus (not illustrated) under this condition.

This optical disk mounted is positioned by the latching sections 42, 43 installed to the edge surface portions 40, 41, that is, by the recessed portion 42a of one latching section 42, at the required position of the mounting by inserting the disk case 31 into the insertion slit of the apparatus with the linear side end edges 40a, 41a of the edge surface portions 40, 41 superimposed on both case sections 32, 33 as a reference guide with the optical disk D housed in the disk case 31 grasped between the center hole d and the circumferential edge portion through the disk rotation opening 38 and the gripping opening 39.

With the disk case 31 positioned at the mounting section of the information recording/reproducing apparatus, the optical dick D is centered at the center hole d and mounted on the turntable of the disk rotation drive mechanism inserted into the inner half side 36a as the disk rotation opening of the opening 36 on the first case section 32 side, while a chucking plate is inserted into the disk rotation opening 38 on the second case section 33 side and is pressed against the center outer surface side of the optical disk D, and the optical disk D is thereby chucked with respect to the turntable and is rotatably driven integrally with the turntable.

Under this condition, the optical head is moved in correspondence with the recording surface side of the optical disk D through the outer half side 36b as a head insertion opening of the opening 36 on the first case section 32 side, and recording information signals are read.

When the optical disk D to be housed in the disk case 31 is a disk directly mounted to the information recording/reproducing apparatus as in the case of a compact disk (CD), the seal 44 is peeled on the side of the second case section 33, which is the cover side of the disk case 31 an at the same time the first case section 32 and the second case section 33 are disengaged by releasing latching between the latching sections 42 and 43 at the edge surface sections 40 and 41, and the optical disk D is taken out from the disk housing section 34 of the first case section 32 and is directly mounted to the apparatus. The optical disk D can be easily taken out by hooking fingers to the circumferential edge of the optical disk D through the outer side of the opening 36 on the first case section 32 side.

Referring Now to FIG. 18 through FIG. 21 inclusive, the embodiment of a fourth example will be described in detail.

A package 51 of this example (herein after called the "disk case") for a disk-form recording medium according to the fourth example is also molded by compressed air forming or compression molding using film materials of styrene-based resin such as polypropylene (PP), polystyrene (PS), etc. and ethylene-based thermoplastic resin as in the case of the disk case 31 according to the third example mentioned above so that the housed disk is able to be seen through.

The disk case 51 comprises a first case section 52 as a case proper that covers the recording surface side, which is one of the surface sides of the optical disk D, and a second case section 53 as a cover for covering the label surface side, which is the other surface side of the optical disk D. The first case section 52 has a disk housing section 54 with a diameter slightly greater than that of the optical disk D formed in a concave surface formed by a protruded edge 55 on the circumference, and a cut-off line 56 is formed with the inner end portion in an arc form in a required width from the center portion to one side edge on a plane 54a of the disk housing section 54, and the cut-off line 56 is formed by notches which do not penetrate the disk housing section 54 as shown in FIG. 21.

By breaking off the section surface surrounded from the center portion to one side portion by the cut-off line 56 of the disk housing section 54 of the first case section 52, a notch opening 57 is formed as shown in FIG. 20, and this notch opening 57 is constructed to allow its inner half side 57a to serve as a disk rotation opening and its outer half side 57b to serve as a head inserting opening.

On the other hand, in the second case section 53, a cover 58 corresponding to the disk housing section 54 of the first case 52 is formed in a circular concave surface form so that it fits to the disk housing section 54 at the outer circumferential side of a protruded edge 55 and at the center portion of a plane 58a of the cover 58, a circular-form cut-line 59 is formed in correspondence with the inner half side 56a of the cut-line 56 of the disk housing section 54, and on one side section of this cover 58, a concave-form cut-line 60 is formed continually in correspondence with an outer edge portion 56b of the cut-line 56 on the disk housing section 54 side, and both the two cut-lines 59 and 60 are also formed by notches which do not penetrate the cover 58.

By tearing off the center surface portion surrounded by the cut-line 59 of the cover 58 of the second case section 53, a circular-form disk rotation opening 61 is formed as shown in FIG. 20, and by tearing off the section surrounded by the cut-line 60 on one side section, a concave-form gripping opening 62 is formed.

The first case section 52 and the second case section 53 are connected at the one side edge section to be able to open and close. That is, on the circumferential edges of the disk housing section 54 of the first case section 52 and the cover 58 of the second case section 53, nearly square-form edge surface sections 63 and 64 are formed from the edge section in the direction crossing at right angles with ends of the cut-lines 56 and 60 to nearly a half-circumference, and connected at the edge in the direction crossing at right angles with the cut-lines 56 and 60 of the edge surface sections 63 and 64, and edge portions 63a and 64a parallel to the longitudinal direction of the cut-line 56 are formed linearly.

To the edge surface portions 63 and 64, engaging or latching sections 65 and 66 for latching each other are installed. The latching section 65 of the edge surface section 63 on the first case section 52 side is formed in a circular convex form, and the latching section 66 of the edge surface portion 64 on the second case section 53 side is formed in a circular concave form so that the latching section 65 is fitted therein, and the latching section 65 on the first case section 52 side is formed in the circular concave form as seen from the outer surface side, and this concave section constitutes a positioning section. By the way, the latching section 66 on the second case section 53 side may be formed in a penetrated hole to which the latching section 65 is fitted.

To house the optical disk D such as a CD-R or a DVD-RAM, etc. in the disk case 51 of the fourth example configured as above, as shown in FIG. 18, the first case section 52 and the second case section 53 are disengaged and the optical disk D is placed in the disk housing 54 of the first case section 52 in such a manner that the optical disk D is placed on the plane portion 54a, and under this condition, the second case section 53 is closed to bring the cover 58 in correspondence with the disk housing section 54 and is fitted together at the outer circumference of the protruded edge 55 and at the same time the latching sections 64 and 65 are latched each other to join the first and the second case sections 52 and 53 in the hermetically sealed condition by superimposing the edge surface sections 63 and 64 as shown in FIG. 19.

By this operation, the disk housing section 54 of the disk case 51, in which the optical disk D is housed, is brought to the hermetically sealed condition because the cut-line 56 on the first case section 52 side and the cut-lines 59, 60 on the second case section 53 side are formed by notches which are not penetrated, and the optical disk D is hermetically sealed and held.

When the optical disk D held to a disk case 51 in the hermetically sealed condition is used, the surfaces in the cut-lines 56, 59, and 60 of the first and the second case sections 52 and 53 are torn off, respectively to form openings. That is, as shown in FIG. 20, tearing off the inside of the cut-line 56 on the first case section 52 side forms the head inserting opening 57 which also serves as a disk rotating opening from the center portion to one side edge at the plane portion 54a of the disk housing section 54, and tearing off the inside of the cut-line 59 of the second case section 53 side forms the disk rotating opening 61 at the center portion of the plane portion 58a of the cover 58, and at the same time tearing off the inside of the cut-line 60 forms the gripping opening 62 which continues to the head inserting opening 57 on the first case section 52 side at the edge portion of the cover 58.

The optical disk will be mounted to an information recording/reproducing apparatus (not illustrated) with the head inserting opening 57, disk rotating opening 51, and gripping opening 52 formed at the disk case 51 in this way.

As in the case of the disk case 31 of the third example described above, this optical disk mounting is positioned by the latching sections 65, 66 installed to the edge surface portions 63, 64, that is, by the outer-surface side recessed portion of one latching section 65, at the required position of the mounting by inserting the disk case 51 into the insertion slit of the apparatus with the linear side end edges 63a, 64a of the edge surface portions 63, 64 superimposed on both case sections 52, 53 as a reference guide with the optical disk D housed in the disk case 51 grasped between the center hole d and the circumferential edge portion through the disk rotation opening 61 and the gripping opening 62.

With the disk case 51 positioned at the mounting section of the information recording/reproducing apparatus, the optical dick D is centered at the center hole d and mounted on the turntable of the disk rotation drive mechanism inserted into the inner half side 57a as the disk rotation opening of the opening 57 on the first case section 52 side, while a chucking plate is inserted into the disk rotation opening 61 on the second case section 53 side and is pressed against the center outer surface side of the optical disk D, and the optical disk D is thereby chucked with respect to the turntable and is rotatably driven integrally with the turntable.

Under this condition, the optical head is moved in correspondence with the recording surface side of the optical disk D through the outer half side 57b as the head insertion opening of the opening 57 on the first case section 52 side, and recording information signals are read.

When the optical disk D to be housed in the disk case 51 is a disk directly mounted to the information recording/reproducing apparatus as in the case of a compact disk (CD), both case sections 52, 53 are not torn off at the cut-lines 56, 59, 60 but keep each of the openings 57, 61, 62 sealed. Under this condition, latches between latching sections 65 and 66 are disengaged at the edge surface portions 63 and 64 to release the first case section 52 and the second case section 53, and the optical disk D is taken out from the disk housing section 54 of the first case section 52 and is directly mounted to the apparatus.

In the disc case 51 according to the fourth embodiment configured as described above, when the both case sections 52, 53 are torn off at the cut-lines 56, 59, 60 and each of the openings 57, 61, 62 is opened, the housed optical disk D is stored and enclosed by affixing the seal, etc. to each of the openings 57, 61, 62 after use so that the optical disk D is hermetically sealed and held.

In the disk cases 31 and 51 of the third and the fourth examples, description was made on the cases when the first case sections 32 and 52 and the second case sections 33 and 53 are formed integrally with thermoplastic resin film material, but these first case sections 32 and 52 and the second case sections 33 and 53 may be formed independently, and in such event, the first case sections 32 and 52 which are the case proper side may be formed with opaque film material and the second case sections 33 and 53 which are the cover side may be formed with transparent or semi-transparent film material.

In such event, if the housed optical disk D has the recording surface side thereof brought to the opaque condition by housing the optical disk D with its recording surface side opposite to the first case sections 32 and 52, and the recording surface side is protected from outside light, etc., while the label surface side is able to be seen through from the transparent or semitransparent second case sections 33 and 53 side, and the housed optical disk D can be clearly identified.

In the disk cases 31 and 51, when the first case sections 32 and 52 and the second case sections 33 and 53 are formed separately, the second case sections 33 and 53 which are the cover side are formed with transparent or semi-transparent film material, while the first case sections 32 and 52 which are the case proper side can be formed with firm paper material or similar thin sheet material. In such event, by housing the optical disk D with its recording surface side opposite to the first case sections 32 and 52, the recording surface side is protected from outside light, etc., while the label surface side is able to be seen through from the transparent or semitransparent second case section 33 and 53 side, and the housed optical disk D can be clearly identified.

By forming the first case sections 32 and 52 which are the case proper side with firm a thin sheet material, strength of the disk cases 31 and 51 increases and handling is still more satisfactory. By the way, when the first case sections 32 and 52 which are the case proper side are formed with the firm thin sheet material having resiliency, the latching sections 42 and 65 of the first case section 32 and 52 side are preferably formed in the through-hole form and the latching sections 43 and 66 on the second case section 33 and 53 side are preferably formed in the concave form so that they can be press-fitted and engaged.

In the disk cases 31 and 51 as packages of the third and the fourth examples configured as described above, same as the packages 1 and 21 of the first and the second examples as described above, cases may be configured to circulate a small amount of air inside and outside the disk cases 31 and 51 or may be configured to be hermetically sealed, and if the disk cases 31 and 51 are configured to be hermetically sealed, the cases may be configured to contain chemicals such as desiccant, deoxidizer, etc. in the disk cases 31 and 51, and to take out these chemicals integrally with the seal 44 and the cut-off section by placing the chemicals at the seal 44 and the cut-off section.

By configuring the disk cases 31 and 51 as packages of the third and the fourth examples in this way, the operation and effects similar to those of the packages 1 and 21 of the first and the second examples described before can be obtained.

Although the invention has been described in its preferred embodiments, it is understood that the present invention shall not be limited to these preferred embodiments and may be varied in various forms without departing from the spirit and scope of the present invention.

For example, the profile may be optionally changed, and it can be made, in general, quadrilateral as seen from the surface, and at the center of this quadrilateral, a circular form disk housing section is formed.

The disk case is, in principle, formed with transparent or semitransparent synthetic resin film material, firm paper material having resiliency, etc., but according to circumstances, it may be formed with a metal thin sheet of aluminum, etc. In addition, for the seal to hermetically seal the openings, synthetic resin, paper, etc. may be used for matrix.

The disk cases according to the present invention are able to be applied not only to a CD, a CD-R, and a DVD-RAM but also a CDV, a CD-I, a CD single, a magneto-optic disk, and other optical disks.

As described above, according to the present invention, by reducing the number of components and hence simplifying the construction, packages for a disk-form recording medium with simple assembly and inexpensive cost are able to be provided.

In the present invention, by housing the disk-form recording medium before recording in a simple package from the beginning, adhesion of fingerprints, dust, etc. to the disk-form recording medium can be prevented and at the same time, troublesome operation to insert the disk into the disk caddie can be eliminated, and it becomes possible to comfortably record and/or reproduce the information.

Furthermore, the disk-form recording medium is able to be used with the recording medium housed in the package, but the recording medium is able to be taken out from the package to use and to be mounted to other reproducing apparatus for reproduction and at the same time, the package can be used as a so-called disposable package.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A package for a disk-form recording medium, comprising:
   a housing container equipped with a housing section for housing the disk-form recording medium;
   a cover equipped with a chucking opening for chucking of the disk-form recording medium opposite to the recording section of the disk-form recording medium of the housing section of the package and for covering the housing section; and
   a sealing member which is affixed to the cover for removably and adhesively sealing the chucking opening, said sealing member having an adhesive layer which prevents readhesion after the sealing member is first removed from the cover.

2. A package system for a disk-form recording medium according to claim 1, wherein a gripping means is provided at a part of the sealing member.

3. A package system for a disk-form recording medium according to claim 1, wherein a member for restricting the movement of the disk-form recording medium in the housing container is provided at a part of the sealing member.

4. A package of a disk-form recording medium according to claim 1, wherein the disk-form recording medium is constructed to be taken out freely from the housing container.

5. A package for a disk-form recording medium, comprising:
   a chucking opening provided in a housing section of the package for chucking the disk-form recording medium opposite to a recording section of the disk-form recording medium contained in a housing section of the package;

a housing container equipped with a cover for covering the housing section; and a sealing member which is affixed to the cover for removably and adhesively sealing the chucking opening, said sealing member having an adhesive layer which prevents readhesion after the sealing member is first removed from the cover.

6. A package system for a disk-form recording medium according to claim 5, wherein a gripping means is provided at a part of the sealing member.

7. A package system for a disk-form recording medium according to claim 5, wherein a member for restricting the movement of the disk-form recording medium in the housing container is provided at a part of the sealing member.

8. A package of a disk-form recording medium according to claim 5, wherein the disk-form recording medium is constructed to be taken out freely from the housing container.

* * * * *